United States Patent
Choi et al.

(10) Patent No.: US 8,577,988 B2
(45) Date of Patent: Nov. 5, 2013

(54) CONTENT DEVICE AND CONTROL METHOD THEREOF

(75) Inventors: Woosik Choi, Seoul (KR); Jeonghwa Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 13/216,881

(22) Filed: Aug. 24, 2011

(65) Prior Publication Data
US 2013/0054673 A1    Feb. 28, 2013

(51) Int. Cl.
G06F 15/167 (2006.01)
G06F 15/16 (2006.01)
H04N 5/445 (2011.01)
H04N 7/173 (2011.01)

(52) U.S. Cl.
USPC ........... 709/213; 709/201; 709/216; 709/203; 725/44; 725/41; 725/46; 725/47; 725/89

(58) Field of Classification Search
USPC .......... 709/201, 203, 213, 214, 216; 707/711; 725/88, 89, 134, 142, 116
See application file for complete search history.

(56) References Cited

U.S. PATENT DOCUMENTS

| | | | |
|---|---|---|---|
| 7,392,312 B1 * | 6/2008 | Philyaw | 709/225 |
| 7,913,282 B2 * | 3/2011 | Ishikawa et al. | 725/87 |
| 8,271,115 B2 | 9/2012 | Yoshida | |
| 2003/0016951 A1 * | 1/2003 | Jakel et al. | 386/125 |
| 2007/0044010 A1 * | 2/2007 | Sull et al. | 715/500.1 |
| 2007/0150930 A1 * | 6/2007 | Koivisto et al. | 725/134 |
| 2008/0082673 A1 * | 4/2008 | Dynin et al. | 709/228 |
| 2009/0164516 A1 | 6/2009 | Svendsen et al. | |
| 2009/0234476 A1 | 9/2009 | Yoshida | |
| 2010/0027966 A1 * | 2/2010 | Harrang et al. | 386/69 |
| 2010/0042642 A1 * | 2/2010 | Shahraray et al. | 707/102 |
| 2010/0169503 A1 * | 7/2010 | Kollmansberger et al. | 709/231 |
| 2011/0106911 A1 | 5/2011 | Sung et al. | |
| 2012/0124090 A1 * | 5/2012 | Matz et al. | 707/780 |

FOREIGN PATENT DOCUMENTS

| | | |
|---|---|---|
| EP | 2 101 273 A2 | 9/2009 |
| JP | 2007-013704 A | 1/2007 |
| JP | 2009-217551 A | 9/2009 |

OTHER PUBLICATIONS

International Search Report dated Sep. 26, 2012 for Application No. PCT/KR2011/006331, 8 pages.

* cited by examiner

*Primary Examiner* — Larry Donaghue
*Assistant Examiner* — Aftab N. Khan
(74) *Attorney, Agent, or Firm* — Fish & Richardson P.C.

(57) ABSTRACT

A device includes a communication unit including at least one of a wireless communication module and a wired communication module. The device also includes a controller configured to access, based on communications received through the communication unit, a plurality of identifiers which each mark a manipulation of content performed by an electronic device. The plurality of identifiers mark manipulations of the content performed by different electronic devices. The controller also is configured to facilitate output, on an output unit, of a representation of the plurality of identifiers. The output unit is separate from the different electronic devices that performed the manipulations of the content marked by the plurality of identifiers.

28 Claims, 30 Drawing Sheets

FIG. 7
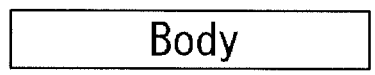
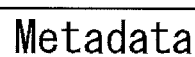
(a)
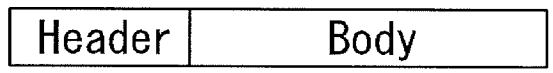
(b)

| BM1 | T1 | TV | Kim |
|---|---|---|---|
| BM2 | T2 | Tablet | Lee |
| BM3 | T3 | Phone | Park |

FIG. 14
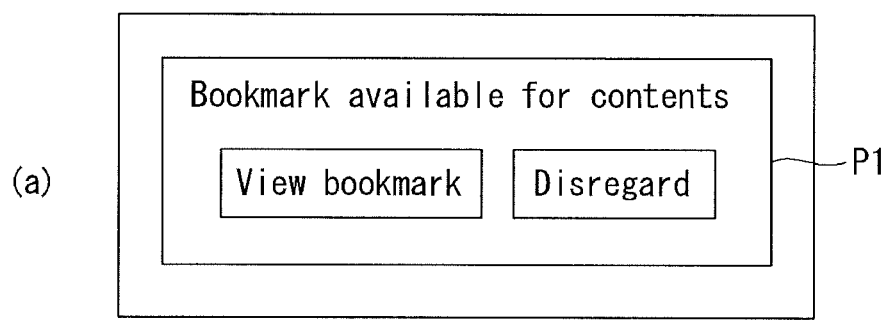
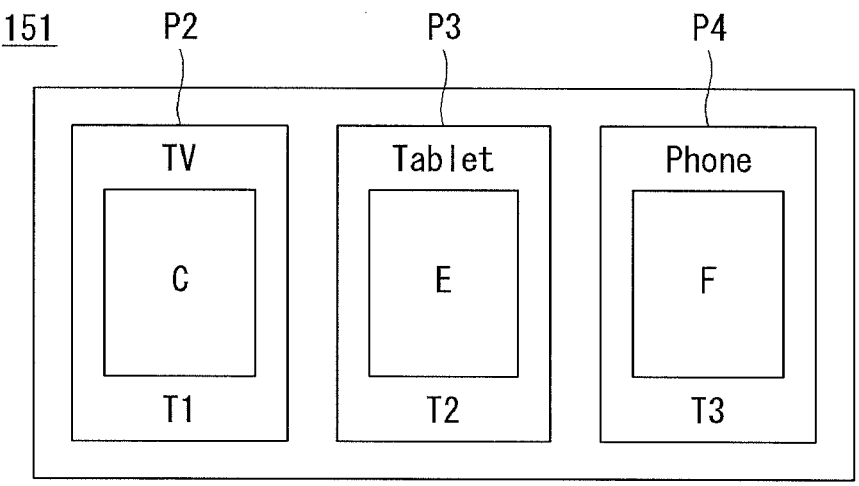

FIG. 15
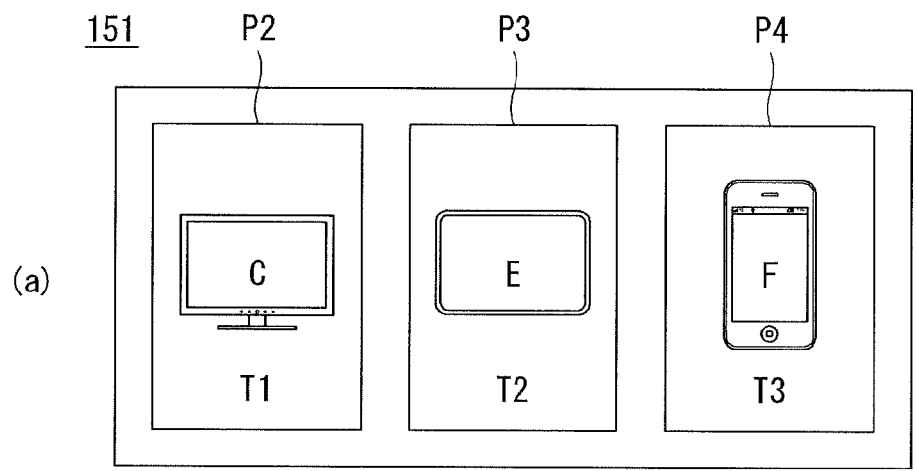
(a)
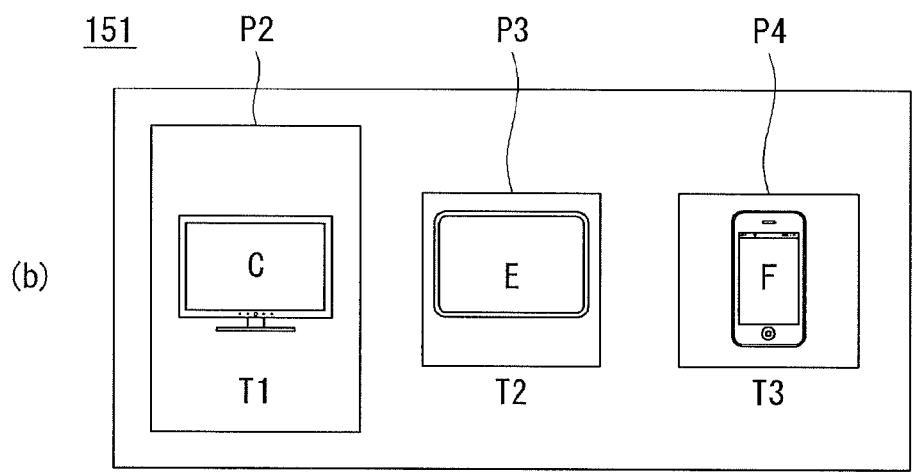
(b)

FIG. 16
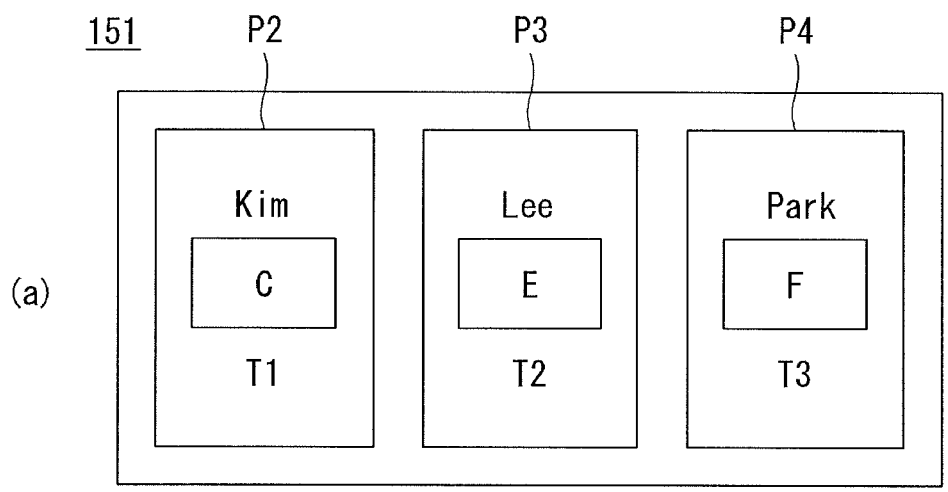
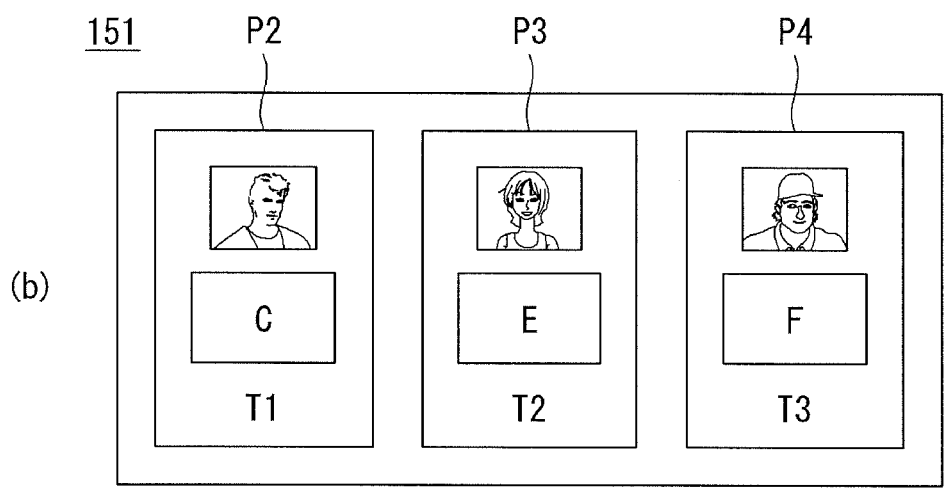

FIG. 18
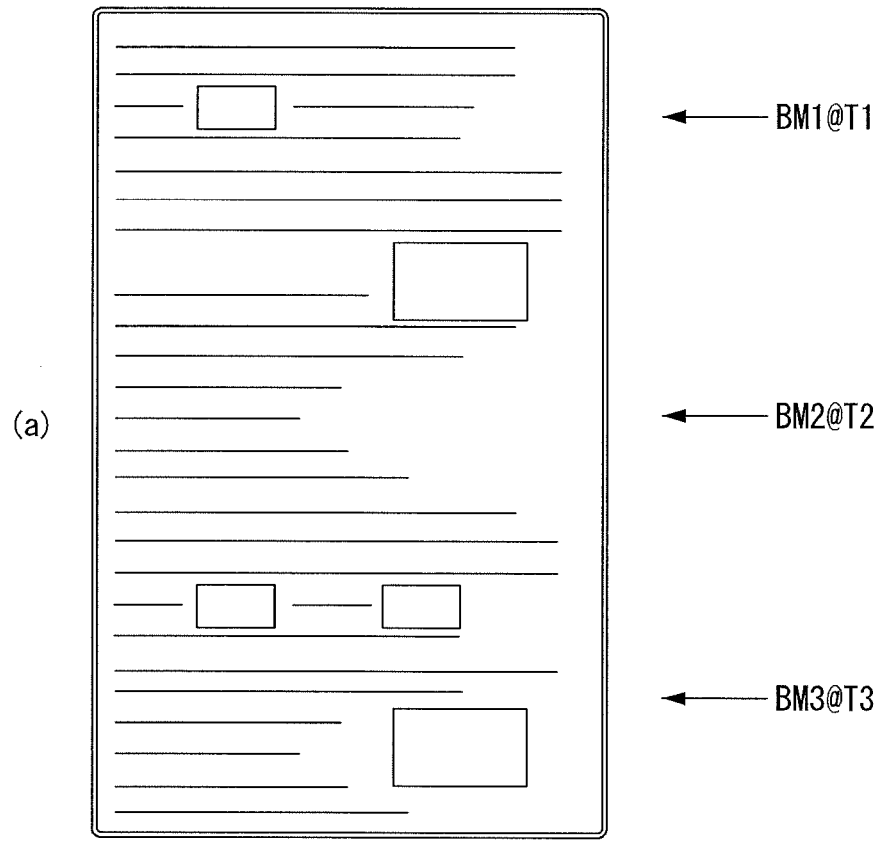
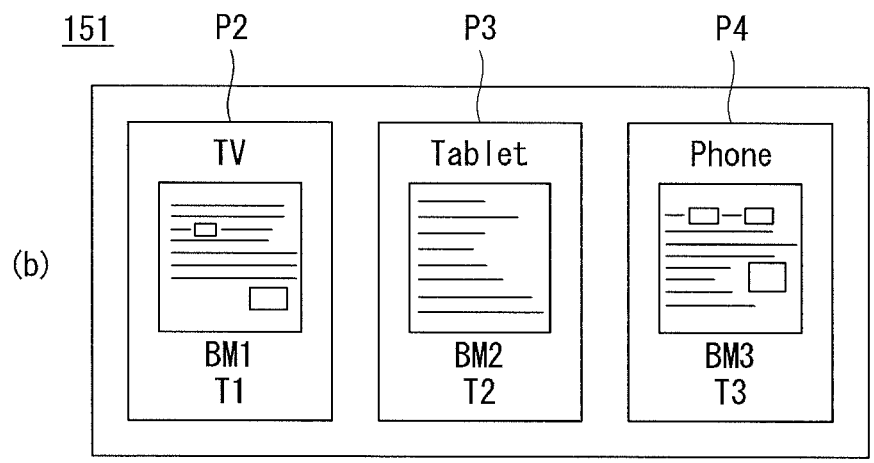

FIG. 19
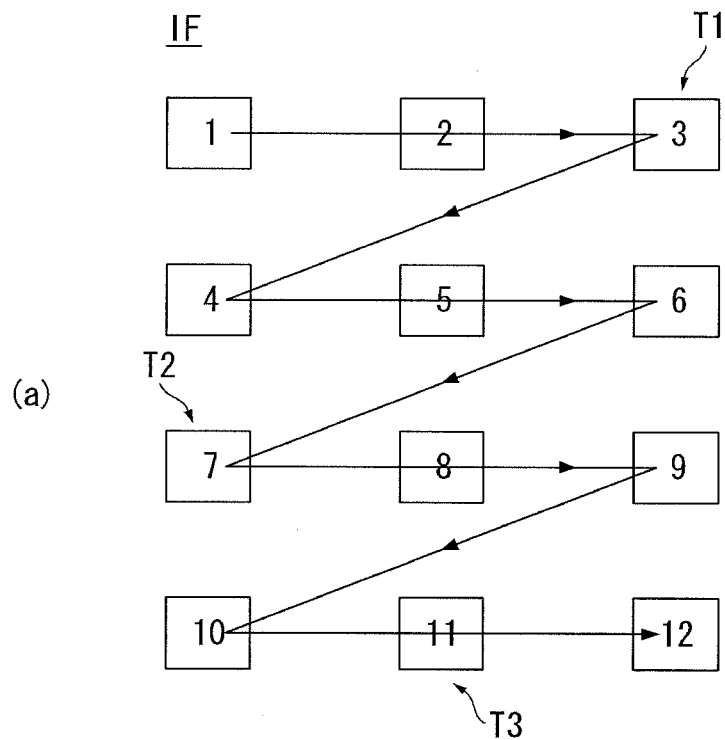
(a)
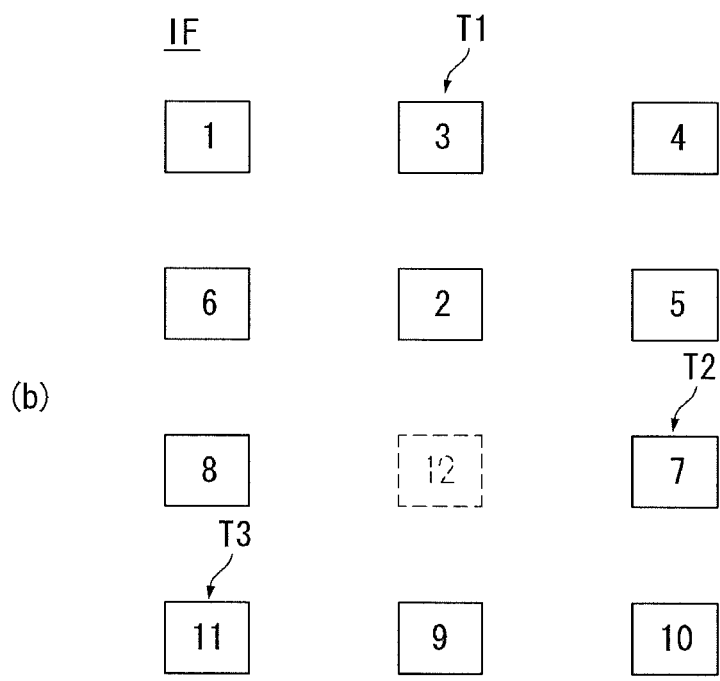
(b)

FIG. 24

| Reproduction reference | Identifier tagged in currently manipulated electronic device |
| --- | --- |
| | Most recently tagged identifier |
| | Identifier tagged by user who is currently manipulating electronic device |

FIG. 27
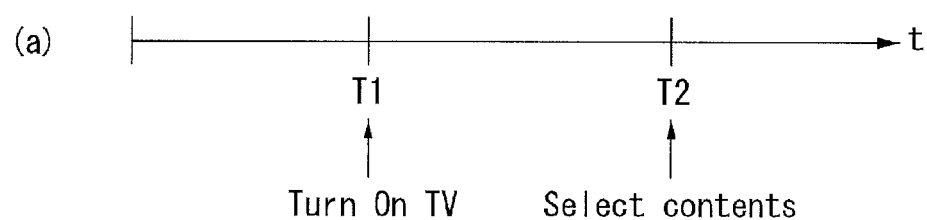
(a)
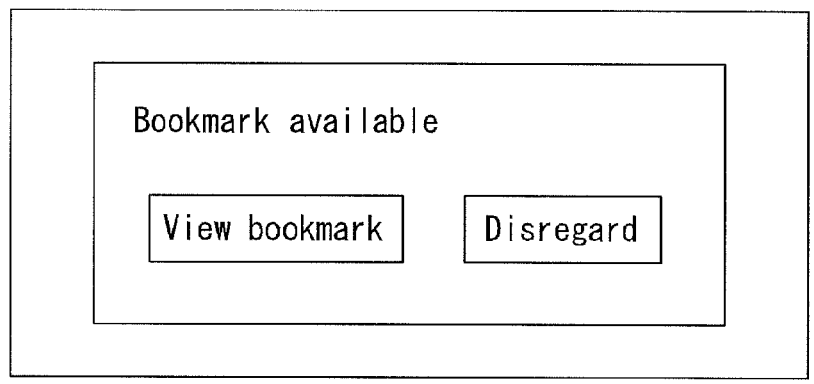
(b)

FIG. 29
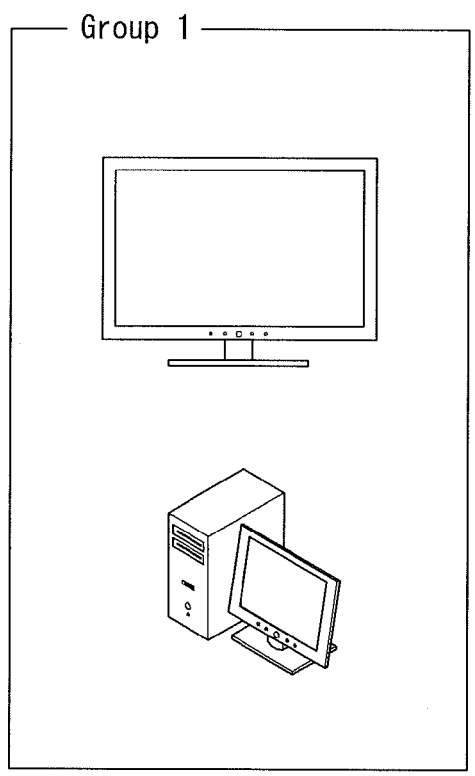
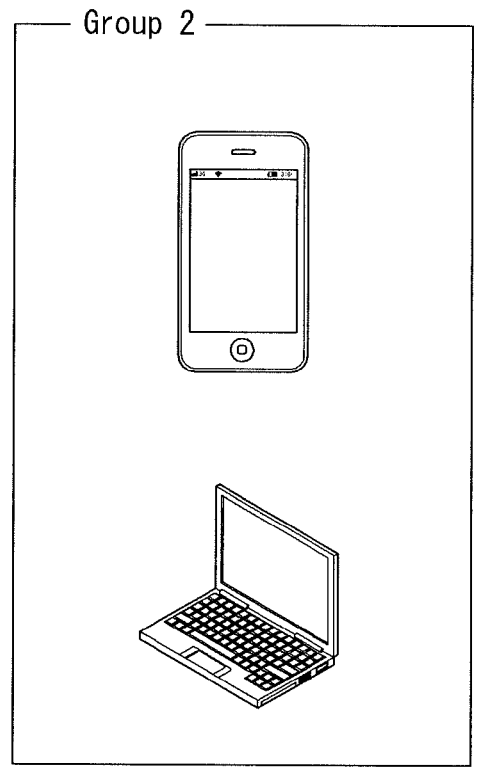

FIG. 30
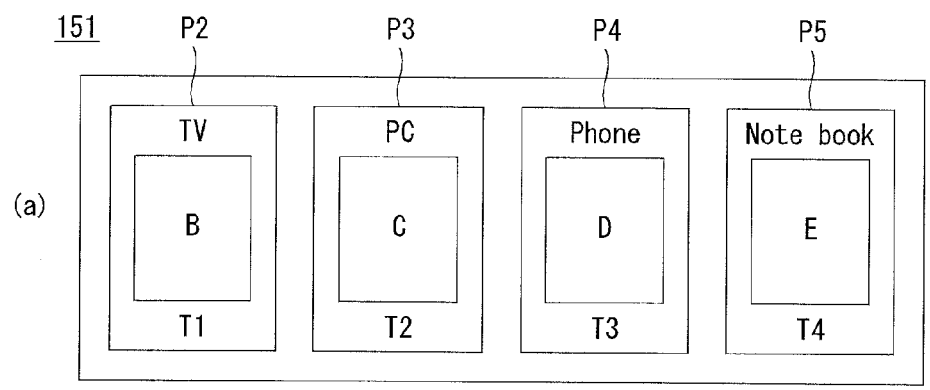
(a)
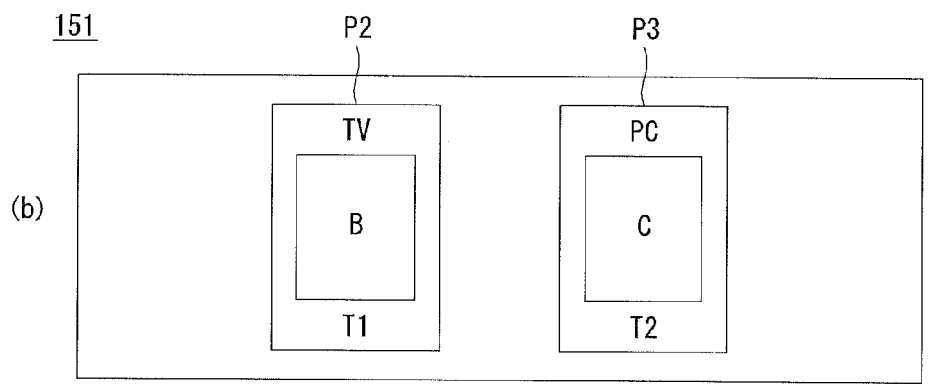
(b)
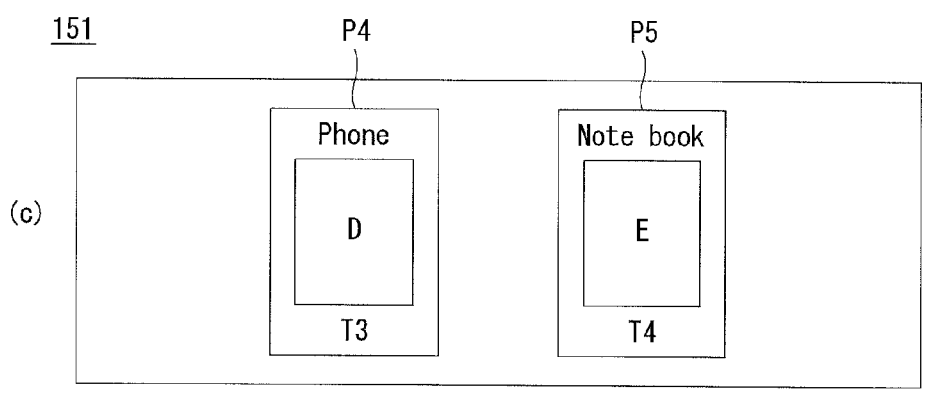
(c)

CONTENT DEVICE AND CONTROL METHOD THEREOF

FIELD

The present disclosure relates to a content device and a control method thereof.

BACKGROUND

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

A terminal as a multimedia player can be referred to as a display device since it generally has a function of displaying video information.

Terminals can be divided into a mobile terminal and a stationary terminal. Examples of mobile terminals include laptop computers, cellular phones, etc. and examples of stationary terminals include television systems, monitors for desktop computers, etc.

SUMMARY

In one aspect, a device includes a communication unit with at least one of a wireless communication module and a wired communication module. The device also includes a controller configured to access, based on communications received through the communication unit, a plurality of identifiers which each mark a manipulation of content performed by an electronic device. The plurality of identifiers mark manipulations of the content performed by different electronic devices. The controller also is configured to facilitate output, on an output unit, of a representation of the plurality of identifiers. The output unit is separate from the different electronic devices that performed the manipulations of the content marked by the plurality of identifiers.

Implementations may include one or more of the following features. For example, the controller may be configured to access a plurality of identifiers which each mark a manipulation of content performed by a user and which each indicate the user that performed the manipulation of content, and facilitate output of the representation of the plurality of identifiers based on the user that performed the manipulation of content indicated by each of the plurality of identifiers. In this example, the controller may be configured to facilitate output of the representation of the plurality of identifiers with an indication of the user that performed the manipulation of content indicated by each of the plurality of identifiers.

In addition, the controller may be configured to determine an identity of a user to which the representation of the plurality of identifiers is to be output and compare the determined identity to indications of the user that performed the manipulation of content indicated by each of the plurality of identifiers. Based on comparison results, the controller may be configured to identify a subset of the plurality of identifiers that match the determined identity and facilitate output of a representation of the identified subset of the plurality of identifiers that match the determined identity.

Further, the controller may be configured to access a plurality of identifiers which each mark a point of the content at which the content was recently output by each of the different electronic devices and facilitate output of the point of the content at which the content was recently output by each of the different electronic devices. The controller also may be configured to access a plurality of identifiers which each mark a task performed on the content by each of the different electronic devices and facilitate output of the task performed on the content by each of the different electronic devices.

In some implementations, the controller may be configured to determine that manipulation of content has terminated and, based on the determination that manipulation of content has terminated, monitor for additional manipulation of the content for a pre-set period of time after the determination that manipulation of content has terminated. Based on the monitoring for additional manipulation of the content for the pre-set period of time after the determination that manipulation of content has terminated, the controller may be configured to determine whether additional manipulation of the content occurred during the pre-set period of time. Based on a determination that additional manipulation of the content occurred during the pre-set period of time, the controller may be configured to continue to monitor to determine whether manipulation of content has terminated. Based on a determination that additional manipulation of the content did not occur during the pre-set period of time, the controller may be configured to perform an operation directed to tagging an identifier for the content based on the manipulation of content that has terminated.

The controller may be configured to perform the operation directed to tagging the identifier for the content by tagging an identifier for the content based on the manipulation of content that has terminated. The controller also may be configured to perform the operation directed to tagging the identifier for the content by asking a user whether to perform tagging of an identifier for the content based on the manipulation of content that has terminated and, in response to asking the user, receiving user input indicating whether the user desires to perform tagging of an identifier for the content based on the manipulation of content that has terminated. Based on the user input indicating a desire by the user to perform tagging of an identifier for the content, the controller may be configured to tag an identifier for the content based on the manipulation of content that has terminated.

In some examples, the controller may be configured to determine whether an identifier is available for each content item included in a set of content items. Based on the determination of whether an identifier is available for each content item included in a set of content items, the controller may be configured to facilitate output of a representation the set of content items with an indication of whether an identifier is available for each content item included in the set of content items. The controller may be configured to facilitate output of the representation of the plurality of identifiers by facilitating output of the plurality of identifiers.

In some implementations, the device may include a display. In these implementations, the controller may be configured to receive, through the communication unit and from a server, communications defining the plurality of identifiers and display, on the display, a representation of the plurality of identifiers.

In some examples, the controller may be configured to receive, through the communication unit and from the different electronic devices, communications defining the plurality of identifiers, and store, in electronic storage, the plurality of identifiers defined based on the received communications. In these examples, the controller may be configured to access, from the electronic storage, the plurality of identifiers defined based on the received communications and facilitate output of the representation of the plurality of identifiers by sending, through the communication unit and to a user device, communications that enable the user device to output a representation of the plurality of identifiers.

Further, the controller may be configured to receive a selection of an identifier from among the plurality of identifiers, determine a position of the content matched to the selected identifier, and facilitate output of the content starting from the determined position of the content matched to the selected identifier. The controller also may be configured to access a plurality of identifiers that each define a reproduction position with respect to the content, each define in which of the different electronic devices the corresponding identifier was tagged, and each define a user that tagged the corresponding identifier.

In another aspect, a method includes accessing, based on communications received through a communication unit that includes at least one of a wireless communication module and a wired communication module, a plurality of identifiers which each mark a manipulation of content performed by an electronic device. The plurality of identifiers mark manipulations of the content performed by different electronic devices. The method also includes facilitating output, on an output unit, of a representation of the plurality of identifiers. The output unit is separate from the different electronic devices that performed the manipulations of the content marked by the plurality of identifiers.

Implementations may include one or more of the following features. For example, the method may include accessing a plurality of identifiers which each mark a manipulation of content performed by a user and which each indicate the user that performed the manipulation of content and facilitating output of the representation of the plurality of identifiers based on the user that performed the manipulation of content indicated by each of the plurality of identifiers. In this example, the method may include facilitating output of the representation of the plurality of identifiers with an indication of the user that performed the manipulation of content indicated by each of the plurality of identifiers.

In addition, the method may include determining an identity of a user to which the representation of the plurality of identifiers is to be output and comparing the determined identity to indications of the user that performed the manipulation of content indicated by each of the plurality of identifiers. The method also may include, based on comparison results, identifying a subset of the plurality of identifiers that match the determined identity and facilitating output of a representation of the identified subset of the plurality of identifiers that match the determined identity.

The method may include accessing a plurality of identifiers which each mark a point of the content at which the content was recently output by each of the different electronic devices and facilitating output of the point of the content at which the content was recently output by each of the different electronic devices. The method also may include accessing a plurality of identifiers which each mark a task performed on the content by each of the different electronic devices and facilitating output of the task performed on the content by each of the different electronic devices.

In some implementations, the method may include determining that manipulation of content has terminated and, based on the determination that manipulation of content has terminated, monitoring for additional manipulation of the content for a pre-set period of time after the determination that manipulation of content has terminated. Based on the monitoring for additional manipulation of the content for the pre-set period of time after the determination that manipulation of content has terminated, the method may include determining whether additional manipulation of the content occurred during the pre-set period of time. Based on a determination that additional manipulation of the content occurred during the pre-set period of time, the method may include continuing to monitor to determine whether manipulation of content has terminated. Based on a determination that additional manipulation of the content did not occur during the pre-set period of time, the method may include performing an operation directed to tagging an identifier for the content based on the manipulation of content that has terminated.

The method may include tagging an identifier for the content based on the manipulation of content that has terminated. The method also may include asking a user whether to perform tagging of an identifier for the content based on the manipulation of content that has terminated and, in response to asking the user, receiving user input indicating whether the user desires to perform tagging of an identifier for the content based on the manipulation of content that has terminated. Based on the user input indicating a desire by the user to perform tagging of an identifier for the content, the method may include tagging an identifier for the content based on the manipulation of content that has terminated.

In some examples, the method may include determining whether an identifier is available for each content item included in a set of content items. In these examples, the method may include, based on the determination of whether an identifier is available for each content item included in a set of content items, facilitating output of a representation the set of content items with an indication of whether an identifier is available for each content item included in the set of content items.

Further, the method may include facilitating output of the plurality of identifiers. In addition, the method may include receiving, through the communication unit and from a server, communications defining the plurality of identifiers and displaying, on a display, a representation of the plurality of identifiers.

In some implementations, the method may include receiving, through the communication unit and from the different electronic devices, communications defining the plurality of identifiers and storing, in electronic storage, the plurality of identifiers defined based on the received communications. In these implementations, the method may include accessing, from the electronic storage, the plurality of identifiers defined based on the received communications and sending, through the communication unit and to a user device, communications that enable the user device to output a representation of the plurality of identifiers.

In some examples, the method may include receiving a selection of an identifier from among the plurality of identifiers and determining a position of the content matched to the selected identifier. In these examples, the method may include facilitating output of the content starting from the determined position of the content matched to the selected identifier. Further, the method may include accessing a plurality of identifiers that each define a reproduction position with respect to the content, each define in which of the different electronic devices the corresponding identifier was tagged, and each define a user that tagged the corresponding identifier.

The details of one or more implementations are set forth in the accompanying drawings and the description, below. Other potential features of the disclosure will be apparent from the description and drawings, and from the claims.

BRIEF DESCRIPTION OF THE DRAWINGS

FIGS. 6 to 8 are views showing an example structure of contents;

FIGS. 14 to 17 are views showing example operations;

FIG. 18 is a view showing an example bookmark of a document;

FIGS. 19 and 20 are views showing example tagging identifiers with respect to images and displaying the tagged images;

FIGS. 24 and 25 are views showing example operations according to reproduction references;

FIGS. 27 and 28 are views showing example operations of the display device; and

FIGS. 29 and 30 are views showing example operations of the display device.

DETAILED DESCRIPTION

Hereinafter, a mobile terminal relating to this document will be described below in more detail with reference to the accompanying drawings. In the following description, suffixes such as 'module' and 'unit' are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
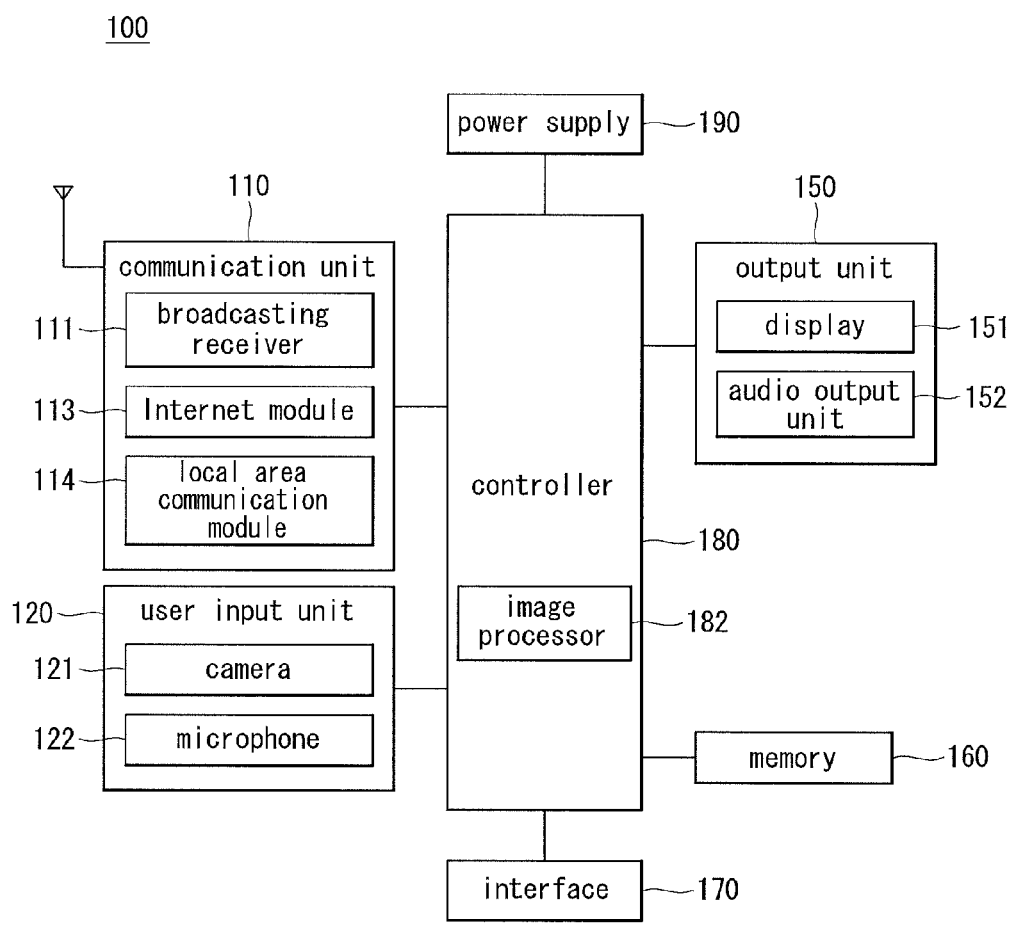
FIG. 1 is a block diagram of an example display device.

FIG. 1 illustrates an example display device 100. As shown, the display device 100 may include a communication unit 110, a user input unit 120, an output unit 150, a memory 160, an interface 170, a controller 180, and a power supply 190. All of the components shown in FIG. 1 may not be essential parts and the number of components included in the display device 100 may be varied.

The communication unit 110 may include at least one module that enables communication between the display device 100 and a communication system or between the display device 100 and another device. For example, the communication unit 110 may include a broadcasting receiving module 111, an Internet module 113, and a local area communication module 114.

The broadcasting receiving module 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal of a data broadcasting signal.

The broadcasting related information may be information on a broadcasting channel, a broadcasting program or a broadcasting service provider, and may be provided even through a communication network.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. The broadcasting signals and/or broadcasting related information received through the broadcasting receiving module 111 may be stored in the memory 160.

The Internet module 113 may correspond to a module for Internet access and may be included in the display device 100 or may be externally attached to the display device 100.

The local area communication module 114 may correspond to a module for near field communication. Further, Bluetooth™ radio frequency identification (RFID), infrared data association (IrDA), ultra wideband (UWB) and/or Zig-Bee™ may be used as a near field communication technique.

The user input 120 is used to input an audio signal or a video signal and may include a camera 121 and a microphone 122.

The camera 121 may process image frames of still images or moving images obtained by an image sensor in a video telephony mode or a photographing mode. The processed image frames may be displayed on a display 151. The camera 121 may be a 2D or 3D camera. In addition, the camera 121 may be configured in the form of a single 2D or 3D camera or in the form of a combination of the 2D and 3D cameras.

The image frames processed by the camera 121 may be stored in the memory 160 or may be transmitted to an external device through the communication unit 110. The display device 100 may include at least two cameras 121.

The microphone 122 may receive an external audio signal in a call mode, a recording mode or a speech recognition mode and process the received audio signal into electric audio data. The microphone 122 may employ various noise removal processes for removing or reducing noise generated when the external audio signal is received.

The output unit 150 may include the display 151 and an audio output module 152.

The display 151 may display information processed by the display device 100. The display 151 may display a user interface (UI) or a graphic user interface (GUI) relating to the display device 100. In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display. The transparent display may include a transparent liquid crystal display. The rear structure of the display 151 may also be of a light transmissive type. Accordingly, a user may see an object located behind the body of terminal through the transparent area of the terminal body, occupied by the display 151.

The display device 100 may include at least two displays 151. For example, the display device 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display 151.

The audio output module 152 may output audio data received from the communication unit 110 or stored in the memory 160. The audio output module 152 may output audio signals related to functions, such as a call signal incoming tone and a message incoming tone, performed in the display device 100.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The display device 100 may also operate in relation to a web storage performing the storing function of the memory 160 on the Internet.

The interface 170 may serve as a path to all external devices connected to the display device 100. The interface 170 may receive data from the external devices or power and transmit the data or power to internal components of the display device terminal 100 or transmit data of the display device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The controller 180 may control overall operations of the display device 100. For example, the controller 180 may perform control and processing for voice communication.

The controller 180 may also include an image processor 182 for processing images, which will be explained in more detail below.

The power supply 190 receives external power and internal power and provides power required for each of the components of the display device 100 to operate under the control of the controller 180.

Various implementations described in this document can be implemented in software, hardware or a computer readable recording medium. According to hardware implementation, described techniques may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The described techniques may be implemented by the controller 180 in some cases.

According to software implementation, described techniques, such as procedures or functions, may be implemented with a separate software module executing at least one function or operation. Software codes may be implemented according to a software application written in an appropriate software language. The software codes may be stored in the memory 160 and executed by the controller 180.

Figure 2:
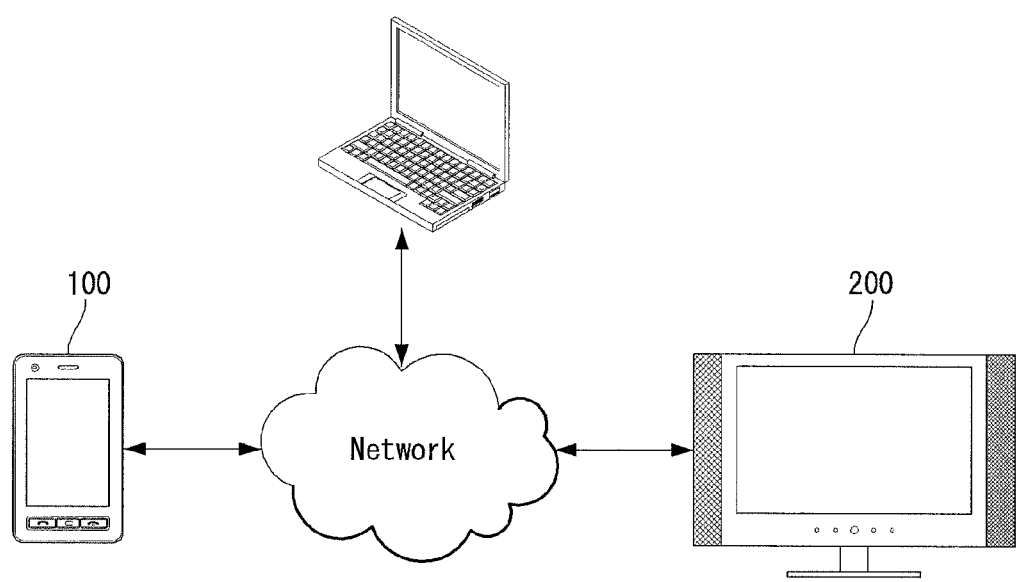
FIG. 2 is a diagram illustrating an example structure of a service network related to the display device of FIG. 1.

FIG. 2 illustrates an example structure of a service network and an example structure of a service network for sharing contents between electronic devices.

Referring to FIG. 2, the display device 100 is connected to at least one outer electronic device 200 that can perform an image display function through a network 300, and transmits contents to the outer electronic device 200 in order to display contents in the outer electronic device 200 or receives contents from the outer electronic device 200 and displays the contents on a screen and thus shares the contents with the outer electronic device 200.

FIG. 2 illustrates a case where the display device 100 is a mobile phone and the outer electronic device 200 is a television (TV) and a laptop computer, but the present disclosure is not limited thereto. According to some implementations, the display device 100 and the outer electronic device 200 may be a mobile phone, a TV, a laptop computer, a smart phone, a digital broadcasting terminal, personal digital assistants (PDA), a portable multimedia player (PMP), a navigation device, a desktop computer, a set-top box, a personal video recorder (PVR), and an electronic frame.

Referring again to FIG. 2, in order for the display device 100 to share contents with the outer electronic device 200, the display device 100 and the outer electronic device 200 may form a platform for mutual compatibility between the display device 100 and the outer electronic device 200. For this reason, the electronic devices 100 and 200 may form a platform based on a digital living network alliance (DLNA).

According to the DLNA, IPv4 can be used as a network stack, and for network connection, Ethernet, Wireless Local Network (WLAN) (802.11a/b/g), Wireless Fidelity (Wi-Fi), Bluetooth, and a communication method that can perform IP connection can be used.

Further, according to the DLNA, in order to discover and control an electronic device, a Universal Plug and Play (UPnP), particularly, UPnP AV Architecture and UPnP Device Architecture may be used. For example, in order to discover an electronic device, a simple service discovery protocol (SSDP) can be used. Further, in order to control an electronic device, a simple object access protocol (SOAP) can be used.

Further, according to the DLNA, in order to transmit media, HTTP and RTP can be used, and JPEG, LPCM, MPEG2, MP3, and MPEG4 can be used as a media format.

Further, according to the DLNA, digital media server (DMS), digital media player (DMP), digital media renderer (DMR), digital media controller (DMC) type electronic devices can be supported.

Figure 3:
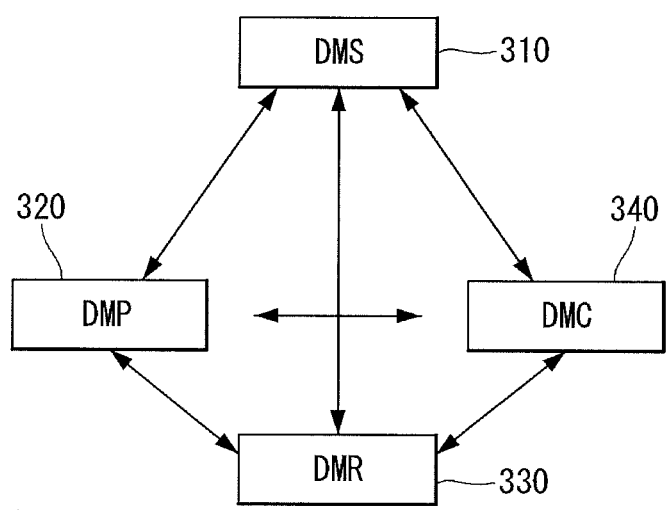
FIG. 3 is a conceptual diagram of an example digital living network alliance (DLNA) network.

FIG. 3 illustrates an example DLNA network. The DLNA is a network and is a typical name of a standardization device for enabling mutual sharing of contents, such as music, a moving image, and a still image, between electronic devices.

The DLNA generally uses an UPnP protocol. The DLNA network includes a DMS 310, a DMP 320, a DMR 330, and a DMC 340.

In some examples, the DLNA network includes at least one of each of the DMS 310, the DMP 320, the DMR 330, and the DMC 340. In these examples, the DLNA provides a specification for mutual compatibility of the each device. Further, the DLNA network provides a specification for mutual compatibility between the DMS 310, the DMP 320, the DMR 330, and the DMC 340.

The DMS 310 provides digital media contents. That is, the DMS 310 stores and manages contents. The DMS 310 receives and executes various commands from the DMC 340. For example, when the DMS 310 receives a play command, the DMS 310 searches for contents to reproduce and provides the contents to the DMR 330. The DMS 310 may include, for example, a personal computer (PC), a personal video recorder (PVR), and a set-top box.

The DMP 320 controls contents or an electronic device, and controls the contents to be reproduced. That is, the DMP 320 performs a function of the DMR 330 for reproduction and a function of the DMC 340 for control. The DMP 320 may include, for example, a TV, a DTV, and a home theater.

The DMR 330 reproduces contents. The DMR 330 reproduces contents that it receives from the DMS 310. The DMR 330 may include, for example, an electronic frame.

The DMC 340 provides a control function. The DMC 340 may include, for example, a mobile phone and a PDA.

Further, the DLNA network may include the DMS 310, the DMR 330, and the DMC 340 or may include the DMP 320 and DMR 330.

Further, the DMS 310, the DMP 320, the DMR 330, and the DMC 340 may define functional classification of an electronic device. For example, when the mobile phone has a reproduction function as well as a control function, the mobile phone may correspond to the DMP 320, and when the DTV manages contents, the DTV may correspond to the DMS 310 as well as the DMP 320.

Figure 4:
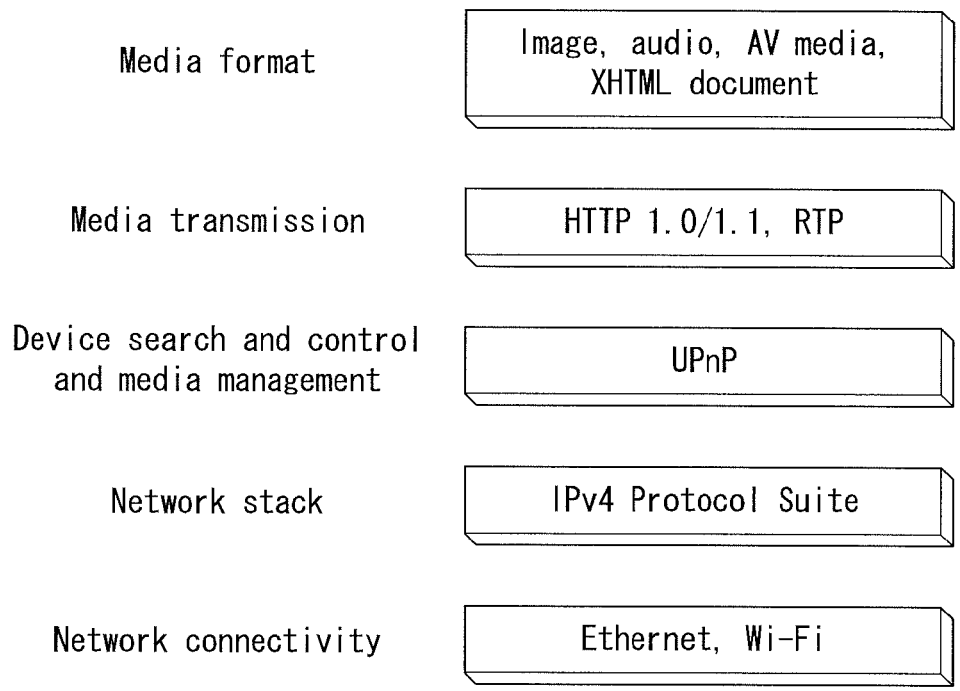
FIG. 4 is a diagram illustrating example layers according to a function of a DLNA.

FIG. 4 illustrates an example function component according to a DLNA. The function component according to the DLNA includes a media format layer, a media transport layer, a device discovery and control and media management layer, a network stack layer, and a network connectivity layer.

The network connectivity layer includes a physical layer and a link layer of a network. The network connectivity layer includes Ethernet, Wi-Fi, and Bluetooth. In addition, the network connectivity layer uses a communication medium that can perform IP connection.

The network stack layer uses an IPv4 protocol. The device discovery and control and media management layer generally uses UPnP, particularly, UPnP AV Architecture and UPnP Device Architecture. For example, for device discovery, an SSDP may be used. Further, for control, SOAP may be used.

The media transport layer uses HTTP 1.0/1.1 or a real-time transport protocol (RTP) in order to reproduce streaming.

The media format layer uses an image, audio, AV media, and extensible hypertext markup language (XHTML) document.

Figure 5:
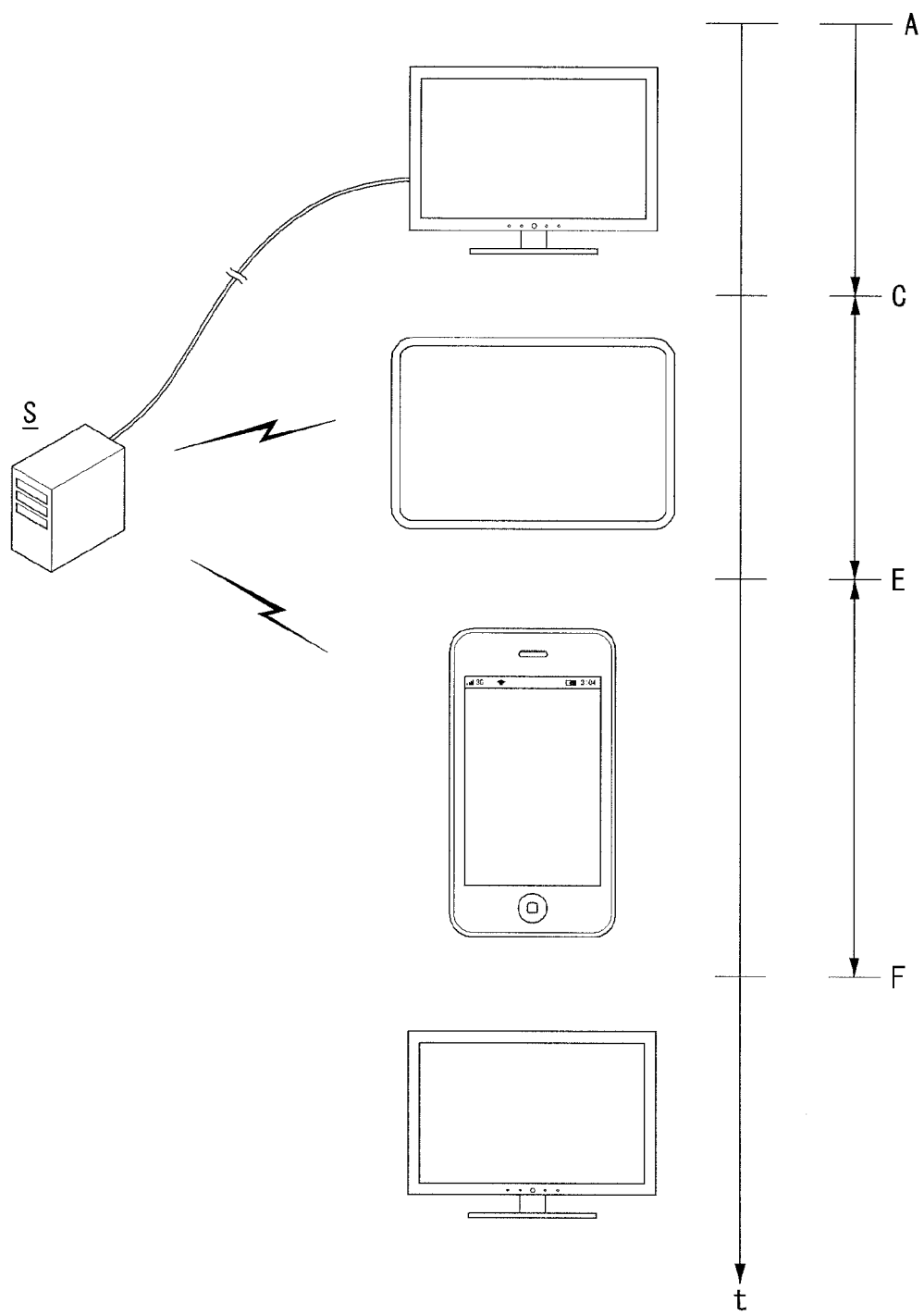
FIG. 5 is a view showing example operations of electronic devices including a display device.
Figure 6:
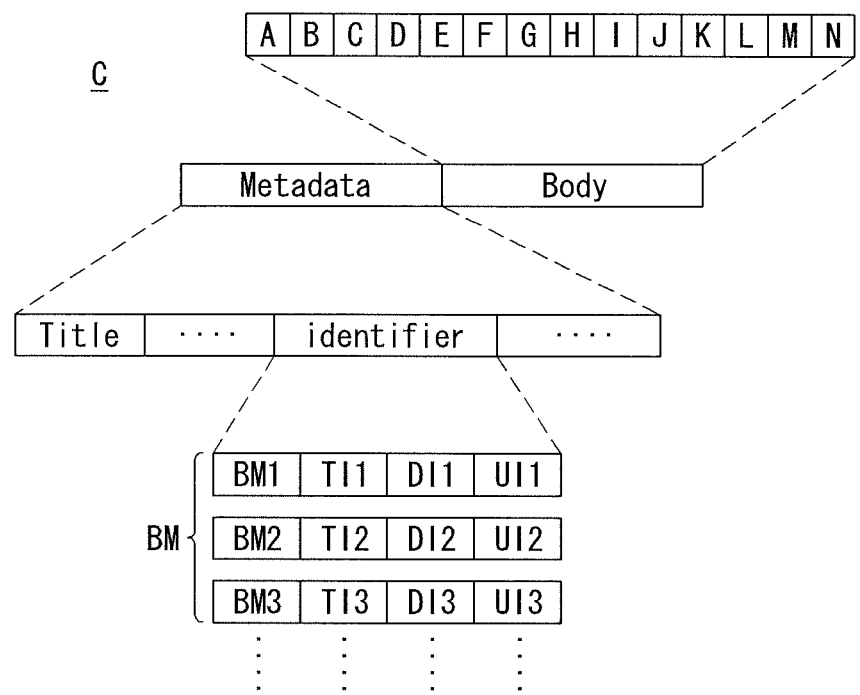

FIG. 5 shows example operations of electronic devices including a display device, and FIGS. 6 to 8 show an example structure of contents.

As shown in FIGS. 5 to 8, a controller (180 in FIG. 1) of a display device 100 may obtain particular contents (C in FIG. 6) including a plurality of tagged identifiers (shown as BMs to indicate bookmarks) from different electronic devices 100, 200a, and 200b and display the same.

A server (S) may be connected to the display device 100 and first and second electronic devices 200a and 200b through a fixed line and/or wirelessly. The server (S) may be a data storage device physically placed at a particular position or a virtual data storage space in the form of a cloud.

The server (S) may be an electronic device having a management attribute with respect to the contents (C). For example, the server (S) may serve as a DMS in a digital living network alliance (DLNA) environment. Thus, the server (S) may be connected to the different electronic devices 100, 200a, and 200b through a fixed line or wirelessly and serve to store the contents (C), transmit the stored contents (C) to the electronic devices 100, 200a, and 200b, or the like.

The server (S) may manage the particular contents (C) and perform a relevant management operation. For example, the server (S) may generate an identifier BM of the particular contents (C) or store the generated identifier BM. The operation of the server (S) including the identifier (BM) is as follows.

The user may render the particular contents (C) in the different electronic devices 100, 200a, and 200b. This may be more clearly understood in case in which the particular contents (C) is video.

The passage of time may be divided into a section P1 from a point in time at which time is 0 (zero) to a point in time T1, a section P2 from the point in time T1 to a point in time T2, and a section P3 from the point in time T2 to a point in time T3.

The user may reproduce (or play) the contents (C) in the section P1 by using the display device 100, reproduce the contents (C) in the section P2 by using the first electronic device 200a, and reproduce the contents (C) in the section P3 by using the second electronic device 200b. Namely, the user may sequentially reproduce the particular single contents (C) through the different electronic devices 100, 200a, and 200b.

The contents (C) may vary. Namely, the contents (C) may include a still image, a video, documents, and the like. Here, an illustrative example is discussed in which images from A to N of the contents (C) as a video are sequentially displayed.

When the user has viewed the contents (C) of the video until the point in time T1, an end point in time of the section P1, by using the display device 100, the video up to a portion C may have been reproduced. When the user has viewed the contents (C) of the video until the point in time T2, an end point in time of the section P2, by using the first electronic device 200a, the video up to a portion E may have been reproduced. When the user has viewed the contents (C) of the video until the point in time T3, an end point in time of the section P3, by using the second electronic device 200b, the video up to a portion F may have been reproduced.

The server (S) may obtain information regarding up to which portion the contents (C) has been reproduced at the points in time T1, T2, and T3 at which the use of the respective electronic devices 100, 200a, and 200b is stopped, respectively. For example, an identifier BM with respect to a corresponding point of the contents (C) as the video can be generated. Here, the identifier BM may be a bookmark.

When there is a request for reproducing the contents (C) from the user, the server (S), having an identifier BM with respect to each point, may provide the identifier BM to the user. Namely, information regarding to which portion the corresponding contents (C) has been reproduced may be shared by the different electronic devices 100, 200a, and 200b. In addition, the identifier BM may include information regarding which of the electronic devices 100, 200a, and 200b has tagged the identifier, and/or information regarding who has tagged the identifier BM.

As shown in FIG. 6, the contents (C) may include a body and metadata.

The body may be a portion including substantial contents of the contents (C). For example, when the contents (C) is a video, the body may be a portion in which the video data is stored. When the contents (C) is a still image, the body may be a portion in which still image data is stored. When the contents (C) is a document, the body may be a potion in which document data is stored.

The metadata may be a portion serving as a header in order to discriminate the contents (C) from other data. For example, the metadata may be a portion including the title of the contents (C), a reproduction time of the contents (C), a creation date of the contents (C), and the like. In addition, the metadata of the contents (C) used in the display device 100 may include an identifier BM.

The identifier BM may include information regarding to which point the corresponding contents (C) has been reproduced in any of the electronic devices 100, 200a, and 200b. For example, the identifier BM may include identification numbers BM1 to BM3, position information TI1 to TI3, device information DI1 to DI3, user information UI1 to UI3, and the like. In addition, the identifier BM may further include geographical information.

The identification numbers BM1 to BM3 may be the number of each identifier BM.

The position information TI1 to TI3 may be information regarding to which position of the corresponding contents (C), the identifier BM has been tagged. For example, the position information TI1 to TI3 may be information regarding to which position of the corresponding contents (C) the identifier BM has been tagged. For example, the position information TI1 to TI3 may be information regarding a reproduction time of the contents (C). The server (S) and/or the electronic devices 100, 200a, and 200b may determine a position from which the contents (C) is to be reproduced, on the basis of the position information TI1 to TI3.

The device information DI1 to DI3 may be information regarding the electronic devices which have tagged the corresponding identifiers BMS. For example, the fact that a first identifier BM1 has been tagged in the display device 100, a second identifier BM2 has been tagged in the first electronic device 200a, and a third identifier BM3 has been tagged in the second electronic device 200b may be stored in the device information DI1 to DI3.

The user information UI1 to UI3 may be information regarding the users who have tagged the corresponding identifiers BM. For example, the fact that first identifier BM1 has been tagged by a first user, the second identifier BM2 has been tagged by a second user, and the third identifier BM3 has been tagged by a third user may be stored in the user information UI1 to UI3.

The controller (180 in FIG. 1) may determine which portion of the contents (C) a user wants to view on the basis of the identifiers BM including the device information DI1 to DI3 and/or user information UI1 to UI3. For example, among the plurality of identifiers BM, the user, who is currently using the display device 100, may reproduce the contents (C), starting from a portion corresponding to the user tagged identifier BM. Also, among the plurality of identifiers BM, the user may reproduce the contents (C), starting from a portion corresponding to an identifier BMS tagged in the display device 100.

Geographical information may be information regarding at which position a corresponding tagging has been performed. The electronic devices 100, 200a, and 200b may obtain a global positioning system (GPS) signal, or the like, and may recognize the location of the electronic devices 100, 200a, and 200b. The tagging of the geographical information may be used as a reference in determining which of the identifiers BM is to be selected when the contents (C) is reproduced later. For example, an identifier BM tagged at the same location may be selected or an identifier BM tagged at a particular location may be selected.

FIG. 6 shows a case in which the body and the metadata are implemented in single contents (C). However, as shown in FIG. 7, the body and the metadata may be configured to have various forms.

As shown in FIG. 7(*a*), the body and metadata of contents (C) may be separately configured. For example, the body and the metadata may be configured as separate files. In this case, the body having a relatively large amount of data and the metadata having a relatively small amount of data may be separately transmitted, thus implementing a potentially improved data transmission/reception environment.

As shown in FIG. 7(*b*), in contents (C), a header and a body are integrally configured, while an identifier may be separately configured. The header may include a configuration for reproducing the body of the contents (C). The identifier may include a bookmark for selectively reproducing a particular portion of the contents (C). By configuring the identifier which may have a smaller amount of data than the metadata, as a separate file, a potentially improved data transmission/reception environment can be implemented.

FIG. 8 shows an example configuration of identifiers BM. As illustrated, the respective identifiers BM1, BM2, and BM3 may include an identification number, position information, device information, and user information.

The position information may indicate a position at which each identifier has been tagged. Namely, the first identifier BM1 may have been tagged to a point in time T1, the second identifier BM2 may have been tagged to a point in time T2, and the third identifier BM3 may have been tagged to a point in time T3.

The device information may indicate a device to which each identifier has been tagged. Namely, the first identifier BM1 may have been tagged in a TV, the second identifier BM2 may have been tagged in a tablet, and the third identifier BM3 may have been tagged in a phone.

The user information may indicate a user who has tagged each identifier. Namely, the first identifier BM1 may have been tagged by Kim, the second identifier BM2 may have been tagged by Lee, and the third identifier BM3 may have been tagged by Park.

Since the identifiers include the information regarding the devices in which the identifiers have been tagged and/or the information regarding the users, basic information for determining which of the identifiers BMS is to be used to perform reproducing can be effectively provided.

Figure 9:
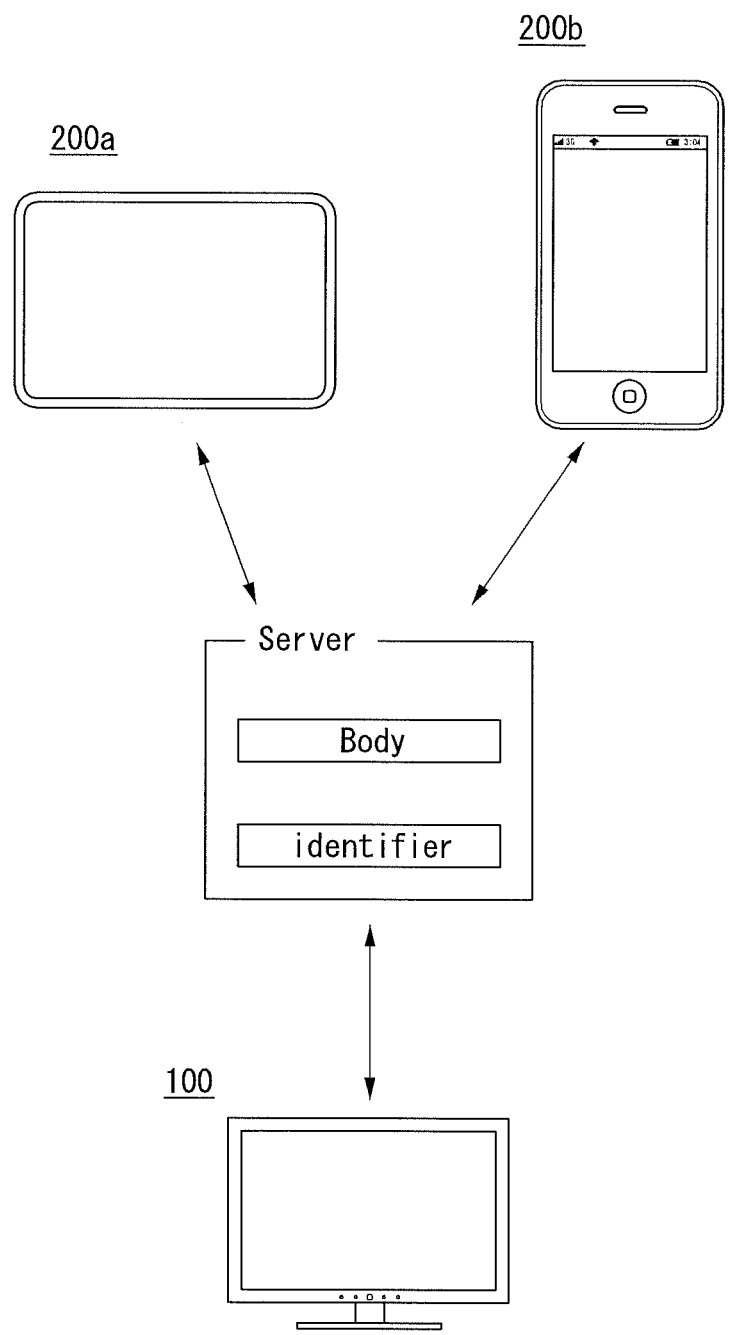
FIGS. 9 to 11 are views showing example positions of contents.
Figure 10:
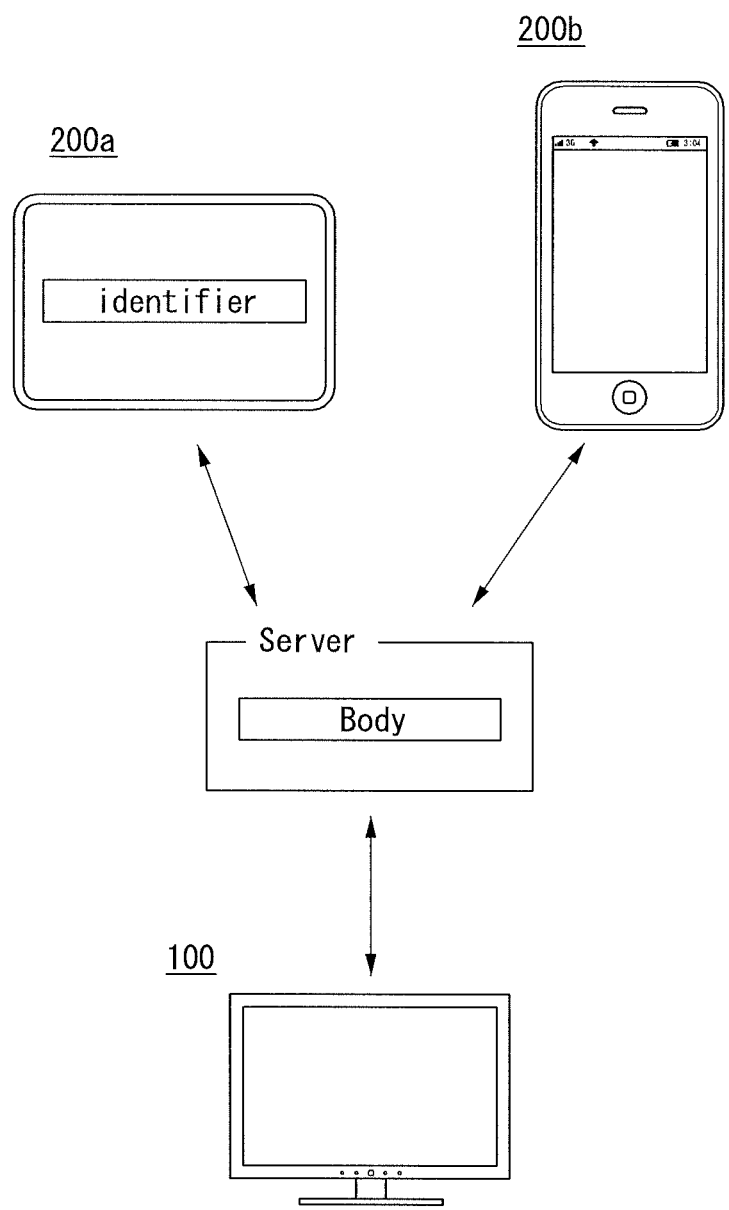
Figure 11:
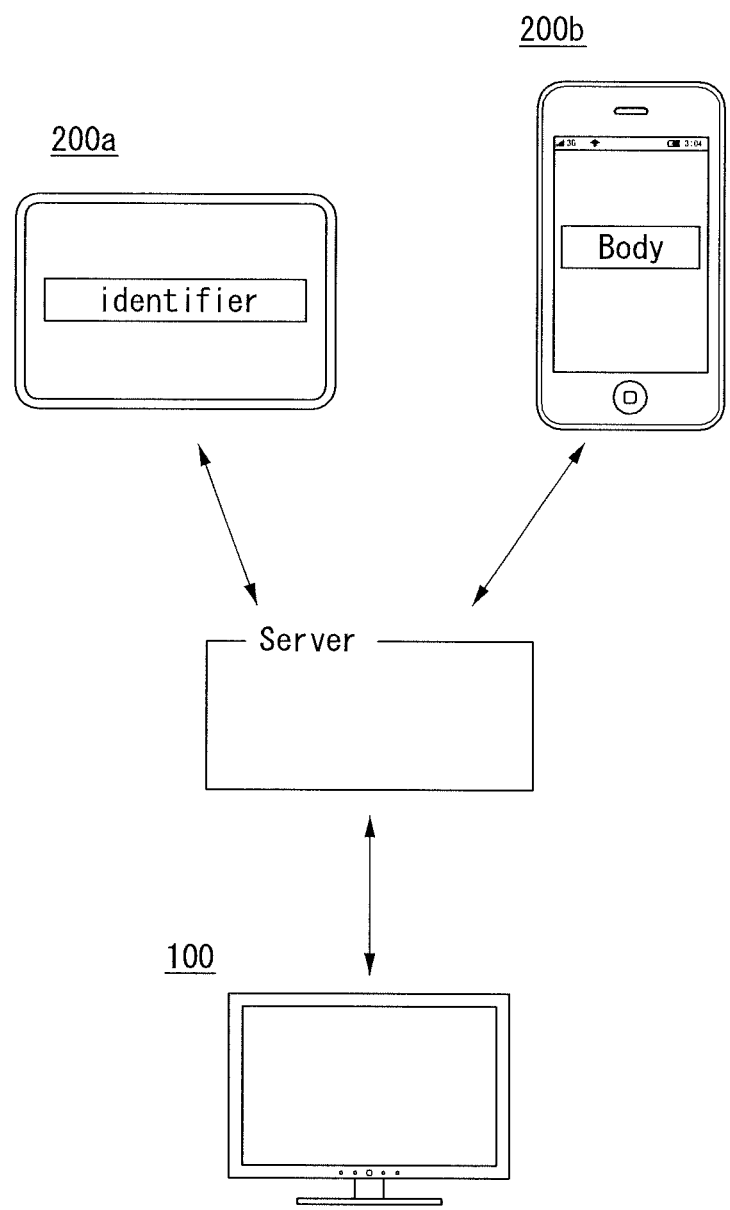

FIGS. 9 to 11 show example positions of contents. As illustrated, contents may be positioned in any one or more of the server (S) and the electronic devices 100, 200a, and 200b.

As shown in FIG. 9, a body and an identifier may be positioned in the server. As mentioned above, the server may include a virtual server of a cloud concept as well as a server physically fixed at a particular position.

The server may transmit the contents to the electronic devices 100, 200a, and 200b according to a corresponding request. For example, the first electronic device 200a may request the contents, and when the first electronic device 200a adds an identifier, corresponding information may be transmitted to the server. The second electronic device 200b may request the contents, and when the second electronic device 200b adds an identifier, corresponding information may be transmitted to the server.

The server may generate an identifier on the basis of the received information. Namely, the server may generate data regarding which point of contents a device has tagged.

The server may store the generated identifier therein. Namely, after obtaining and generating the tagging information, the server may perform continuous maintenance on the tagging information.

When a request is received from the electronic devices 100, 200a, and 200b, the server may transmit the body and/or identifier to allow the contents to be reproduced.

As shown in FIG. 10, the identifier may be positioned in the electronic devices 100, 200a, and 200b, not in the server. For example, the body, a substantial data part of the contents, may be positioned in the server, while the identifier assisting in reproducing the body may be distributed to be positioned in the first electronic device 200a.

When the identifier is positioned in an area other than the server, the following operation may be performed. For example, when the display device 100 requests contents, the server may transmit the stored body to the display device 100. In addition, the server may inform the display device 100 about the position of the identifier. The display device 100, which has obtained the position of the identifier, may request the identifier from the first electronic device 200a on the basis of the information.

The server may obtain an identifier from the first electronic device 200a and transmit the obtained identifier to the display device 100 according to a corresponding request from the display device 100. This operation may be expressed as a data relay.

When the display device 100, which reproduces contents, tags a particular position of the contents, corresponding information may be transferred to the first electronic device 200a through the server or may be directly transmitted to the first electronic device 200a. Upon receiving the information, the first electronic device 200a may update the identifier.

As shown in FIG. 11, both the identifier and the body may be positioned in the electronic devices 100, 200a, and 200b, not in the server. For example, the identifier may be positioned in the first electronic device 200a, and the body may be positioned in the second electronic device 200b.

When the display device 100 requests contents, the server may inform the display device 100 about the position of the identifier and the body. Or, the server may temporarily obtain the identifier and the body and transmit the same to the display device 100. Namely, the identifier and the body may be relayed from the first and second electronic devices 200a and 200b to the display device 100.

Figure 12:
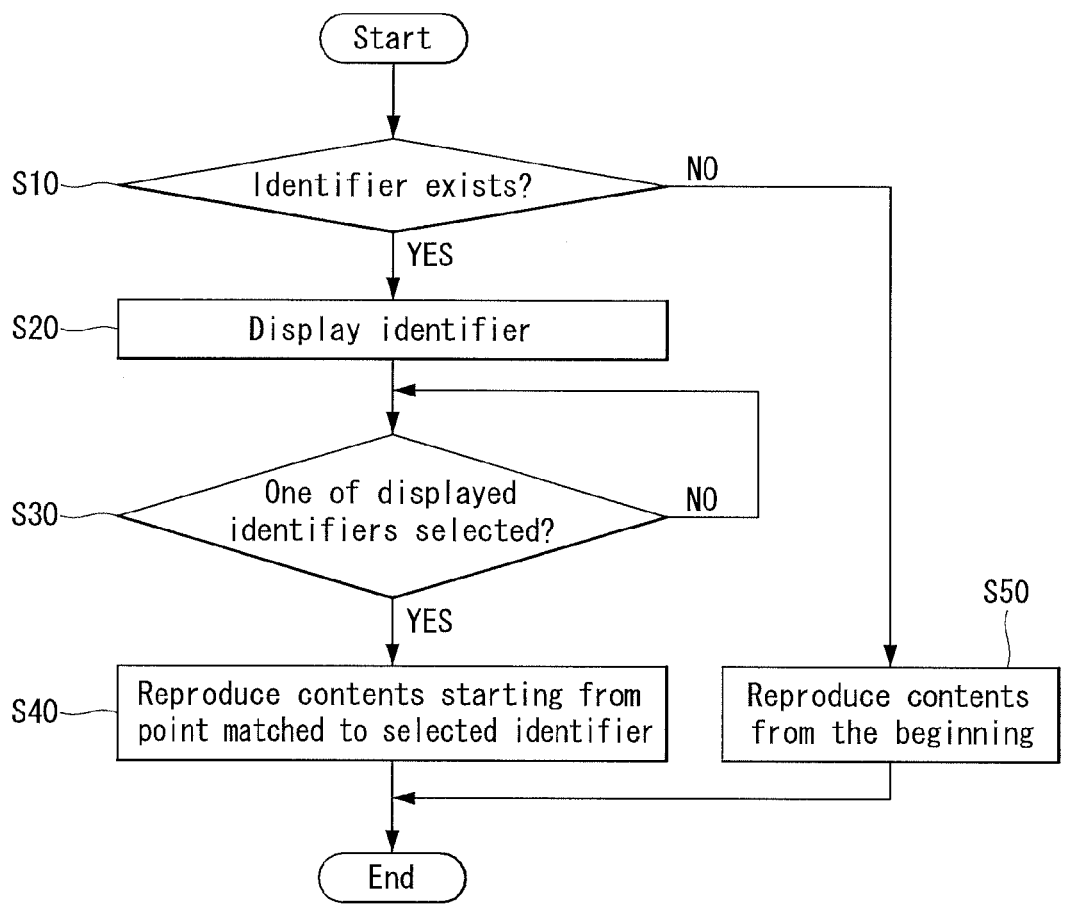
FIGS. 12 and 13 are flow charts illustrating an example process of an operation of the display device.
Figure 13:
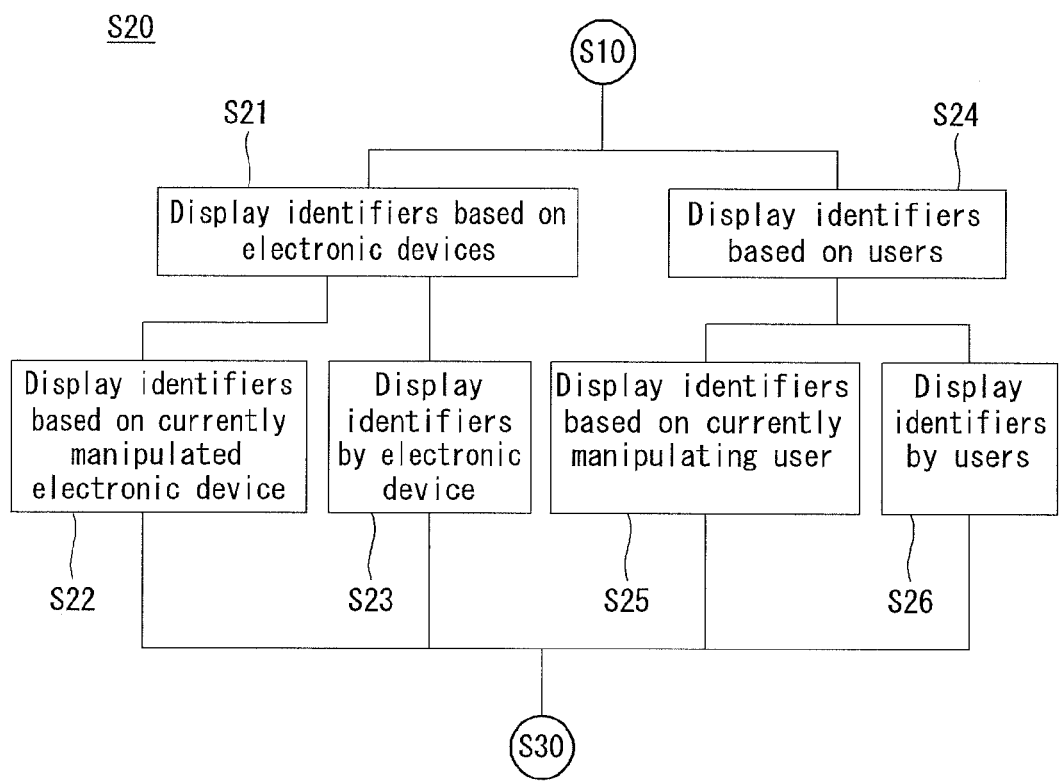

FIGS. 12 and 13 illustrate an example process of an operation of the display device. As shown in FIGS. 12 and 13, the controller (180 in FIG. 1) of the display device 100 may determine whether or not an identifier exists (S10).

When an identifier does not exist, step S50 of reproducing contents from the beginning may be performed. When the content is first reproduced or when there is no tagging with respect to the corresponding contents, an identifier, a bookmark, may not exist. In this case, the contents may be reproduced from the beginning if there is no particular manipulation.

When there is an identifier, step S20 of displaying the identifier may be performed.

A plurality of identifiers may exist. The controller (180 in FIG. 1) may display the plurality of identifiers on the display (151 in FIG. 1).

As shown in FIG. 13, the identifiers may be displayed on the basis of electronic devices (S21) or may be displayed on the basis of users (S24).

When the identifiers are displayed on the basis of the electronic devices (S21), the identifiers may be displayed on the basis of the types of electronic devices which have tagged the identifiers.

Step S21 of displaying the identifiers on the basis of electronic devices may include step S22 of displaying the identifiers on the basis of a currently manipulated electronic device and/or step S23 of displaying respective electronic devices.

The electronic devices may be displayed on the currently manipulated electronic device in the following case. Namely, when particular contents is tagged in the TV, the tablet, and the phone, respectively, a method of displaying an identifier may be different according to the electronic device for reproducing the contents. For example, when the TV is currently manipulated, an identifier tagged in the TV, among identifiers, may be primarily displayed or the contents may be reproduced on the basis of the identifier.

When the identifiers are displayed by electronic devices, the tagged identifiers may be displayed together with the types of the electronic devices which have tagged the identifiers. The user may select an identifier on the basis of the displayed types of the electronic devices.

Step S24 of displaying the identifiers on the basis of users may include step S25 of displaying the identifiers on the basis of a currently manipulating user and/or step S26 of displaying the identifiers by users.

Information regarding who has manipulated the electronic devices may be obtained through various routes. For example, the user of the electronic devices may be determined on the basis of log-in information regarding the devices, or the user of the electronic devices may be determined on the basis of a detection of a user through a device mounted in the electronic devices. In addition, the user of the electronic devices may be estimated on the basis of activity such as usage history of the devices.

The identifiers may be displayed on the basis of a currently manipulating user in the following case. Namely, particular contents may have been tagged by first and second users. With the particular contents tagged, the first user may currently attempt reproducing the contents. In this case, the identifier tagged by the first user may be primarily displayed or the contents may be reproduced on the basis of the identifier tagged by the first user.

Displaying of the identifiers by users may include displaying the tagged identifiers together with the information regarding the users who have tagged the identifiers. Each user may select an identifier which has been tagged by himself or which has been tagged by different person and reproduce the same on the basis of the displayed information.

FIGS. 14 to 17 show example operations. As shown in FIGS. 14 to 17, the display device 100 may display identifiers (BM) in various manners.

As shown in FIG. 14(a), the controller (180 in FIG. 1) may display a first display window P1 which displays the presence of a bookmark, an identifier BM, and/or allows for a user input with respect to how to handle the identifier.

The user may select one of a bookmark view menu or a disregard menu displayed on the first display window P1.

As shown in FIG. 14(b), when the user selects the bookmark view menu, second to fourth display windows P2 to P4 may be displayed on the display 151. In FIG. 14, the case of displaying the second to fourth display windows P2 to P4 is illustrated, but the number of display windows may vary depending on the number of the identifiers BM.

The second to fourth display windows P2 to P4 may be matched to the identifiers BM, respectively. For example, the second display window P2 may be matched to the first identifier BM1, the third display window P3 may be matched to the second identifier BM2, and the fourth display window P4 may be matched to the third identifier BM3.

Type information of the electronic devices which have tagged corresponding identifiers BM, still images of the contents matched to tagged positions, and time information regarding tagged position may be displayed on the second to fourth display windows P2 to P4.

The user of the display device 100 may view and check the displayed second to fourth display windows P2 to P4 and select a desired identifier BM. When the identifier BM is selected, the controller (180 in FIG. 1) may reproduce the contents, starting from a corresponding point. Namely, the controller may request a transmission of the contents at the corresponding point from the server (S) and display received contents.

As shown in FIG. 15(a), information displayed on the second to fourth display windows P2 to P4 may be displayed in the form of an image to help the user understand by intuition. For example, when the first identifier BM1 matched to the second display window P2 has been tagged in a TV, an image of the TV may be displayed, when the second identifier BM2 matched to the third display window P3 has been tagged in a tablet, an image of the tablet may be displayed, and when the third identifier BM3 matched to the fourth display window P4 has been tagged in a phone, an image of the phone may be displayed. By displaying the images of the electronic devices from which the identifiers BM have been tagged, the user can select any of them by intuition.

As shown in FIG. 15(b), the controller (180 in FIG. 1) may display the display window matched to the devices currently displaying the second to fourth display windows P2 to P4 such that it is different from the other display windows. For example, when the second to fourth display window P2 to P4 are currently displayed through the display 151 of the TV, the second display window P2 matched to the first identifier BM1 which has been tagged through the TV may be displayed to be larger than the other display windows or may be displayed in a different color. In addition, the controller (180 in FIG. 1) may immediately reproduce contents at the position matched to the identifier which has been tagged in the electronic device currently manipulated by the user.

As shown in FIG. 16(a), the controller (180 in FIG. 1) may display the second to fourth display windows P2 to P4 and display information regarding the users who have tagged the second to fourth display windows P2 to P4. For example, when the first identifier BM1 matched to the second display window P2 has been tagged by Kim, the second identifier BM2 matched to the third display window P3 has been tagged by Lee, and the third identifier BM3 matched to the fourth display window P4 has been tagged by Park, the information regarding the users who have tagged the second to fourth display windows P2 to P4 may be displayed.

As shown in FIG. 16(b), the controller (180 in FIG. 1) may display the images and/or animation characters of the users on the second to fourth display window P2 to P4. Thus, the user may quickly recognize the identifiers which have been tagged by himself or by others by intuition.

Figure 17:
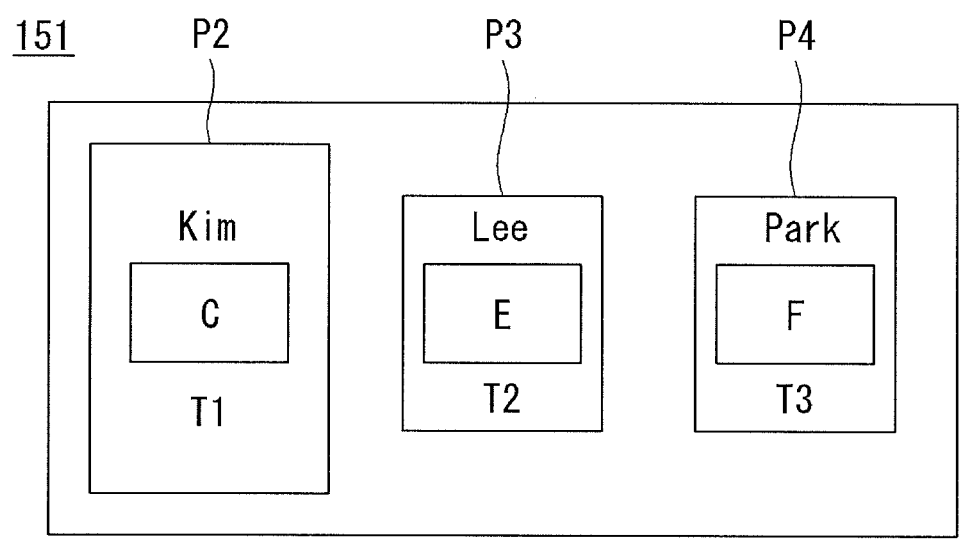

As shown in FIG. 17, the controller (180 in FIG. 1) may display the display window matched to a particular user such that it is different from the other display windows. For example, when the user who has tagged the first identifier BM1 matched to the second pop-up window P2 is Kim and the user Kim is currently manipulating the display device 100, the controller (180 in FIG. 1) may display the second pop-up window P2 differently from the third and fourth pop-up windows P3 and P4. In addition, the controller 180 may automatically reproduce the contents (C) from the portion corresponding to the identifier which has been tagged by the user who is currently manipulating the display device 100.

Information regarding the user who is using a particular device may be obtained through log-in record with respect to the particular device, an analysis of an image captured by using a camera mounted in the particular device, or the like. In addition, who is the user may be determined through the record of the user who has used the particular device. For example, who is the user using the device may be determined on the basis of information accumulated through records such as an access record with respect to a particular Web Site, an access record with respect to particular contents, an access record with respect to a particular document, and the like.

FIG. 18 shows a bookmark of a document. As shown in FIG. 18, the display device 100 according to an exemplary embodiment of the present invention may add an identifier BM to a document DOC and appropriately display the added identifier BM on the display 151.

As shown in FIG. 18(a), first to third identifiers BM1 to BM3 may be tagged to the document DOC. Each of the identifiers may be tagged in different devices at points in time T1 to T3. For example, the first identifier BM1 may be tagged while the user is viewing a TV until the point in time T1, the second identifier BM2 may be tagged while the user is viewing the document through the tablet until the point in time T2, and the third identifier BM3 may be tagged while the user is viewing the document through the phone until the point in time T3.

As shown in FIG. 18(b), the controller (180 in FIG. 1) may display the second to fourth display windows P2 to P4 on the display 151. The second to fourth display windows P2 to P4 may be matched to first to third identifiers BM1 to BM3 tagged to the document DOC.

Information related to the tagged identifiers may be displayed on the second to fourth display windows P2 to P4. For example, information regarding when the identifiers have been tagged at which position of which device may be displayed.

Figure 20:
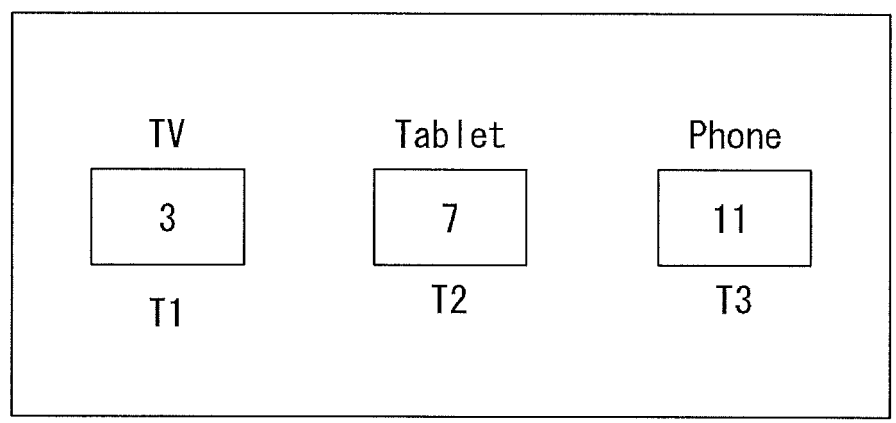

FIGS. 19 and 20 show examples of tagging identifiers with respect to images and displaying the tagged images. As shown in FIGS. 19 and 20, searching for images in different electronic devices and displaying the same may be more conveniently performed through identifiers.

As shown in FIG. 19(a), first to twelfth images 1 to 12 may be positioned in a virtual image folder IF according to pre-set order. In this case, the user may sequentially search and view the first to twelfth images according to pre-set order. In this manner, the user may view the third image 3 at the point in time T1, the seventh image 7 at the point in time T2, and may view the eleventh image 11 at the point in time T3. Meanwhile, T1, T2, and T3 may be points in time at which identifiers have been tagged to the images in the respective devices.

As shown in FIG. 19(b), searching and displaying of images may be randomly performed. Namely, unlike the images in FIG. 19(a), random images selected by the user may be displayed. According to the random selection, the third image 3 may have been tagged to the point in time T1, the seventh image 7 may have been tagged to the point in time T2, and the eleventh image 11 may have been tagged to the point in time T3.

As shown in FIG. 20, information regarding the images which have been tagged at the points in time T1, T2, and T3, respectively, may be displayed on the display 151. The information regarding the displayed images may be displayed together with information regarding the devices in which the bookmarks have been tagged. Namely, the identifiers, e.g., the bookmarks, may be displayed by the tagged devices. Thus, the user can easily select an image he has viewed in a certain device.

Figure 21:
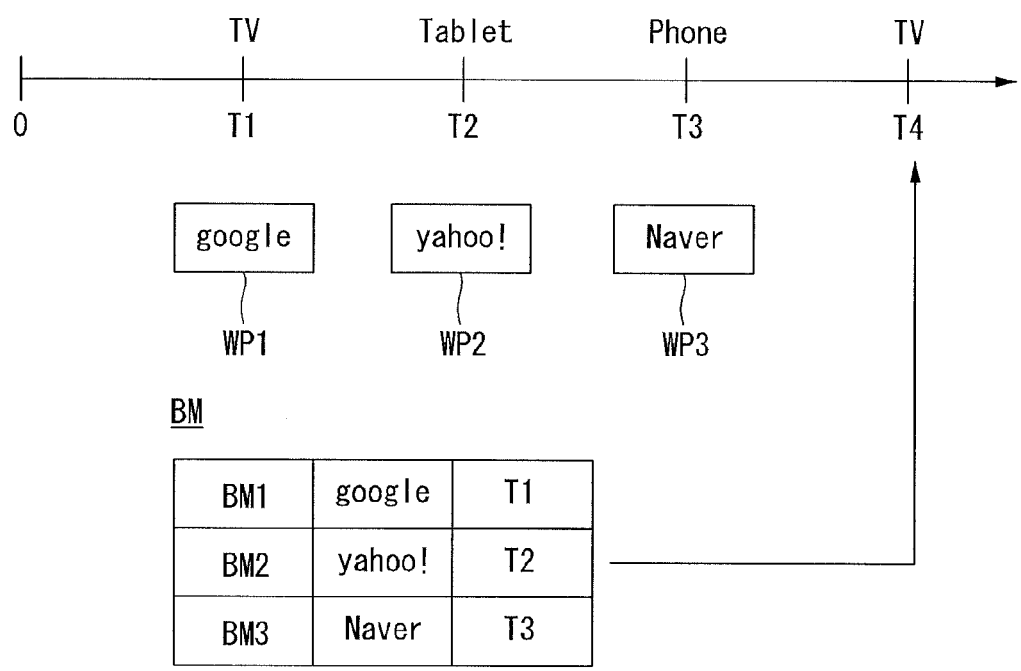
FIG. 21 is a view showing example identifiers with respect to Web pages.

FIG. 21 shows example identifiers with respect to Web pages. As shown in FIG. 21, the identifiers BM may reflect history that the respective Web pages WP1 to WP3 have been displayed.

The user may add the first identifier BM1 to the first Web page WP1 at the point in time T1, add the second identifier BM2 to the second Web page WP2 at the point in time T2, and add the third identifier BM3 to the third Web page WP3 at the point in time T3. The identifiers BM may include the first to third identifiers BM1 to BM3.

The user may access the Web page at a point in time T4 by using the TV. In this case, the controller (180 in FIG. 1) may provide information regarding the respective identifiers BM1 to BM3 to the user. The user may easily check Web page search history and easily move to a particular Web page through the provided information regarding the identifiers BM.

Figure 22:
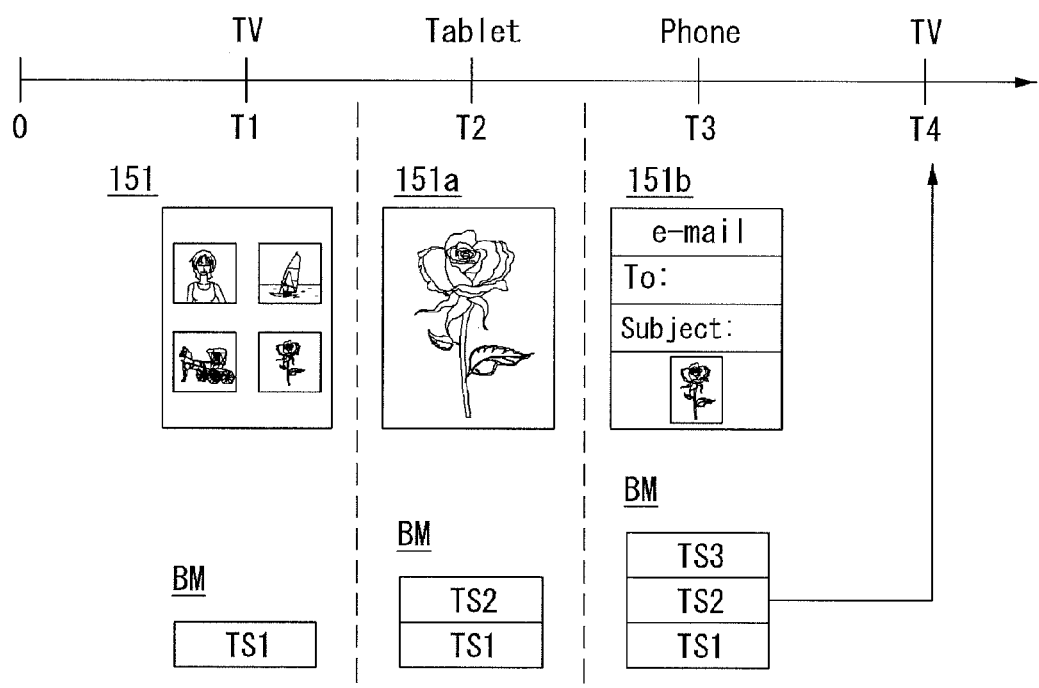
FIG. 22 is a view showing example identifiers with respect to applications.

FIG. 22 shows example identifiers with respect to applications. As shown in FIG. 22, the identifiers BM may be stored and used like a stack. Namely, the identifiers BM may be pushed and popped in a stack so as to be operated.

Thumbnail images may be displayed on the display 151 of the TV. In this case, a first task TS1 for displaying a thumbnail image may be pushed to the identifier BM.

A second task TS2 may be additionally pushed to the identifier BM to which the first task TS1 was pushed at the point in time T1. The second task TS2 may be a task for executing a function of displaying an image selected from the thumbnail images on the entire screen. Thus, the image may be displayed as an entire screen image on the display 151a of the tablet currently used by the user.

At the third point in time T3, a third task TS3 may be pushed to the identifier BM to which the second task TS2 was pushed at the point in time T2. The third task TS3 may be a task for executing a function of transmitting a selected image as an attachment of an e-mail. Thus, a screen image for transmitting an e-mail by attaching an image may be displayed on the display 151b of the phone currently used by the user.

At a point in time T4, the user may execute an identifier BM for transmitting an e-mail by using the TV. In this case, the user may pop up the tasks in reverse order of the pushed tasks. Namely, the tasks may be executed in order of third, second, and first tasks TS3, TS3, and TS1. Thus, the user may naturally perform the previous operations in the different electronic devices without having to repeat them.

Figure 23:
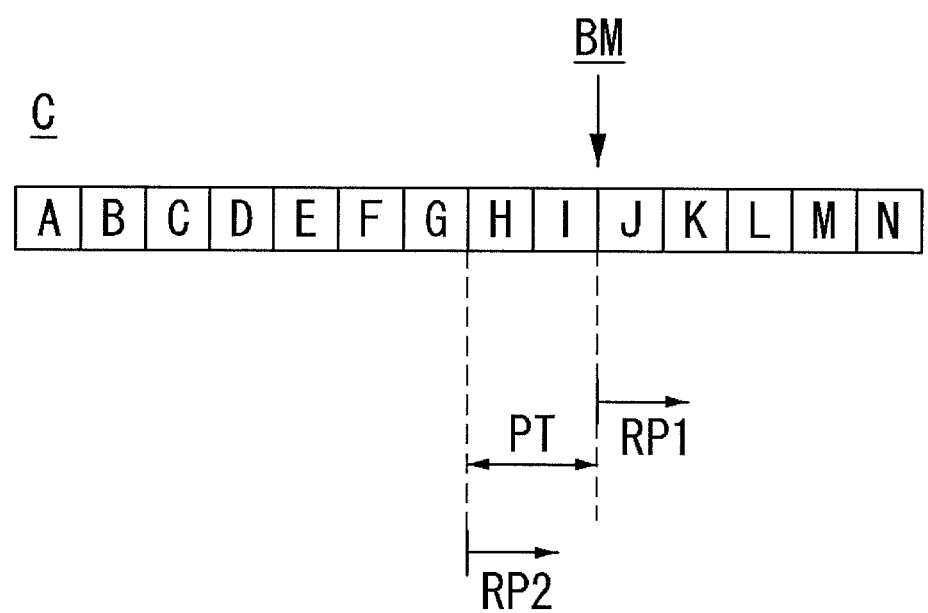
FIG. 23 is a view showing an example reproduction position of contents.

FIG. 23 shows an example reproduction position of contents. As shown in FIG. 23, the contents (C) may be executed starting from a pre-set particular point.

An identifier BM may be tagged to a certain position of the contents (C).

When the contents are reproduced on the basis of the information of the tagged identifier BM, the contents (C) may be reproduced starting from a first position RP1 or a second position RP2.

The first position RP1 may be a point of the contents (C) at which the identifier BM has substantially been tagged, from which reproducing is performed.

The second position RP2 may be a point separated by a certain period of time from the point at which the identifier BM is tagged. Namely, the second position RP2 may be a point separated by a separation time RT behind the first position RP1. Thus, even if a portion of an image is missing or lost in a transmission and reception process, the user can smoothly view a desired image.

The separation time RT may change according to circumstances. For example, when the interval between the past point in time at which the identifier BM was tagged and a current point in time at which the identifier BM is selected is great, the separation time R may be increased.

When the identifier BM was tagged in the remote past, the user's memory of the contents (C) may be dim. Thus, in this case, the separation time RT is set to be great such that the contents (C) is reproduced starting from a point in time in the further distant past than the point in time at which the identifier BM was tagged.

When the identifier is tagged in a point in time in the rather recent past, the user's memory of the contents (C) may be distinct. Thus, in this case, the separation time RT is set to be small such that the contents (C) is reproduced starting from a point in time in the more recent past from the point in time at which the identifier BM was tagged.

Figure 25:
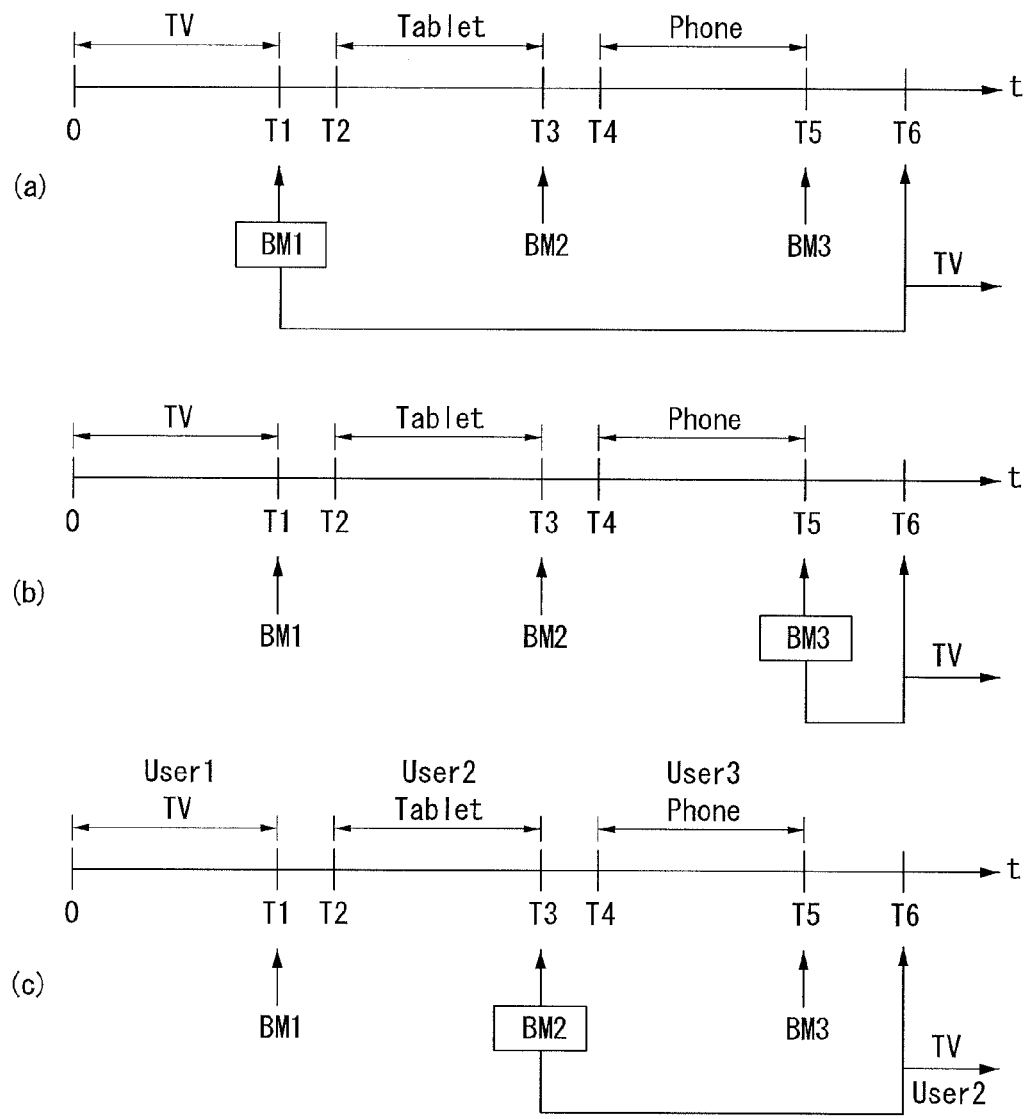

FIGS. 24 and 25 show example operations according to reproduction references. As shown in FIGS. 24 and 25, the display device 100 may select an identifier on the basis of various reproduction references.

With reference to FIG. 24, the reproduction reference may be an identifier tagged in the currently manipulated electronic device, the most recently tagged identifier, or an identifier tagged by the user who is currently manipulating an electronic device. Each example is described in more detail with reference to FIG. 25.

As shown in FIG. 25(a), particular contents may be displayed until the point in time T1 through the TV. As the use of the TV is terminated at the point in time T1, the first identifier BM1 may be created.

The particular contents may be displayed through the tablet from the point in time T2 to the point in time T3. As the use of the tablet is terminated at the point in time T3, the second identifier BM2 may be created.

The particular contents may be displayed through the phone from the point in time T4 to the point in time T5. As the use of the tablet is terminated at the point in time T5, the third identifier BM3 may be created.

At the point in time T6, the user may want to display the particular contents by manipulating the TV again. In this state, the controller (180 in FIG. 1) may reproduce the contents starting from the position matched to the first identifier BM1 tagged in the same device as the currently manipulated TV. In this case, the contents may be provided with the same resolution or viewing conditions to meet the intention of the user who wants to view the contents.

As shown in FIG. 25(b), when the user wants to display the particular contents by manipulating the TV at the point in time T6, the controller (180 in FIG. 1) may reproduce the contents starting from the position matched to the third identifier BM3 which has been tagged most recently. This method may be effective when the contents is continuously viewed by the same user.

As shown in FIG. 25(c), when the second user wants to display the particular contents by manipulating the TV at the point in time T6, the controller (180 in FIG. 1) may reproduce the contents starting from the position matched to the second identifier BM2 tagged by the second user. This method may be effective when the persons who view the contents are different.

FIGS. 25(a) to (c) illustrate example use cases, but the present disclosure is not limited thereto and the three conditions may be combined to operate. For example, the user may consider the same case, and when the user is the same user, he may execute the contents starting from the most recently tagged position.

Figure 26:
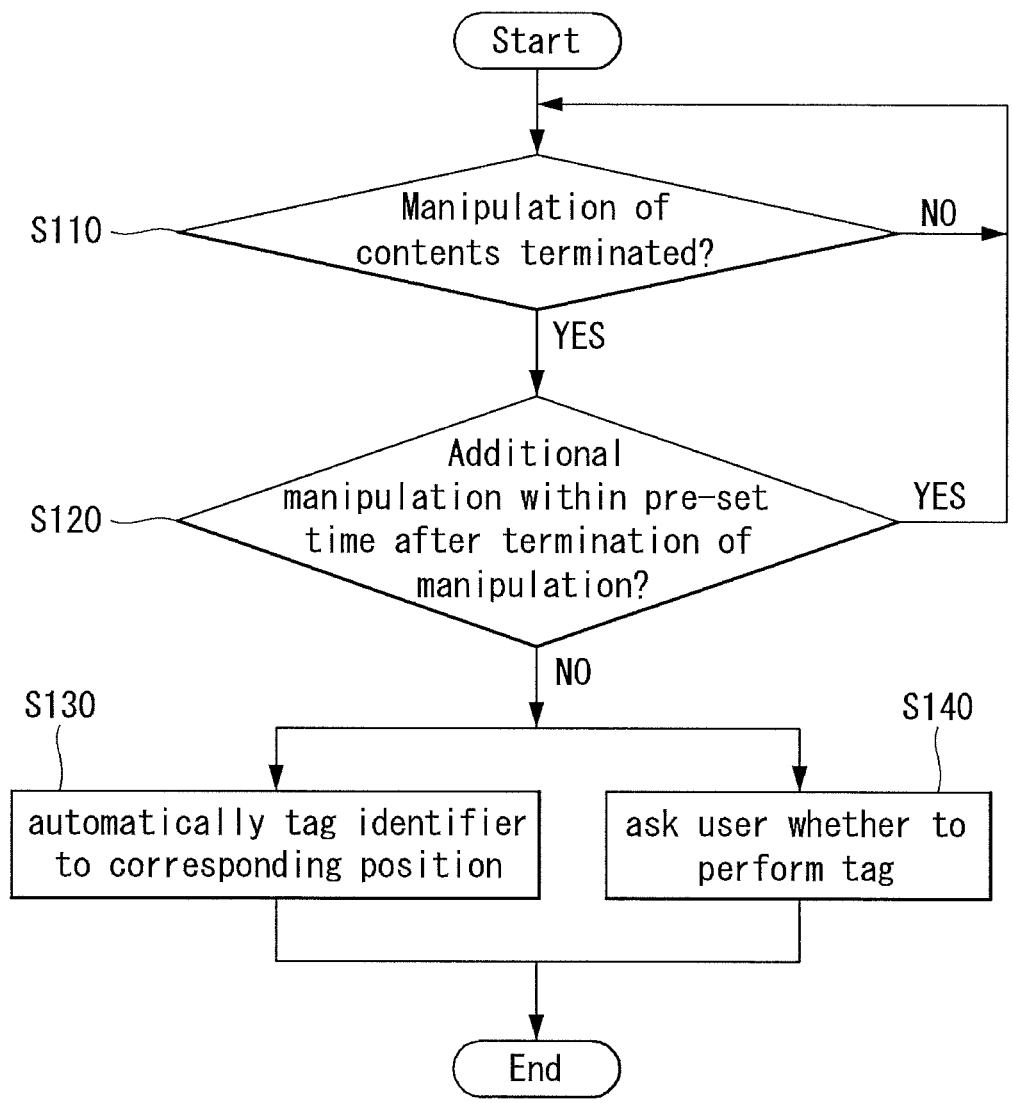
FIG. 26 is a flow chart illustrating an example process of a tagging operation.

FIG. 26 illustrates an example process of a tagging operation. As shown in FIG. 26, the tagging operation may include step S110 of determining whether or not the manipulation with respect to the contents has been terminated.

The tagging of an identifier may be performed in a particular device at a point in time at which the manipulation with respect to the contents is terminated.

When the manipulation with respect to the contents is terminated, step S120 includes determining whether or not an additional manipulation occurs in a pre-set period of time after the manipulation is terminated.

When the manipulation with respect to the contents has been terminated by mistake, the user may execute the contents again within a certain time, thus preventing an identifier from being unnecessarily created.

When no additional manipulation occurs within the pre-set period of time after the manipulation is terminated, the tagging may be automatically performed on the corresponding position (S130) or the user may be asked to confirm whether to perform tagging (S140).

Figure 28:
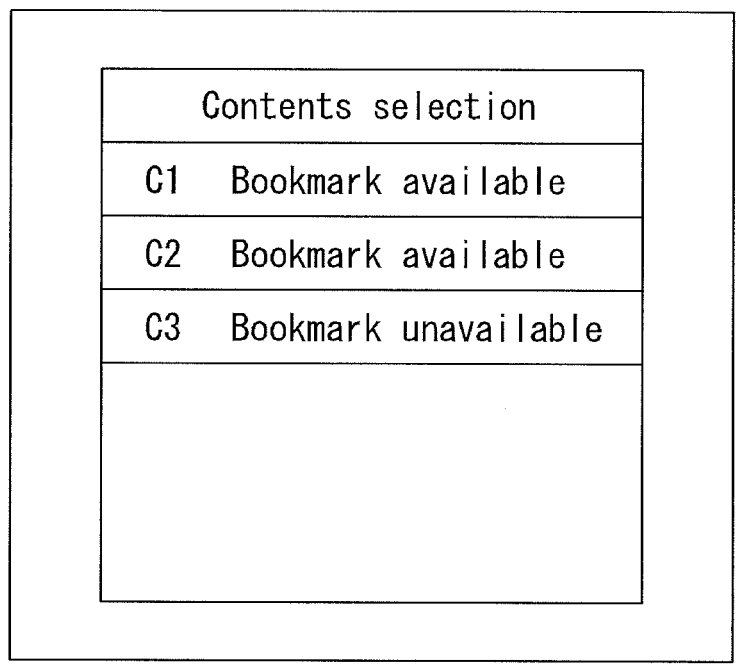

FIGS. 27 and 28 show example operations of the display device. As shown in FIGS. 27 and 28, the display device 100 may display the presence or absence of identifiers BM in various manners.

With reference to FIG. 27(a), the display device 100 may display the presence or absence of an identifier BM at a point in time T1 at which the display device 100 is turned on. For example, when the user turns on the TV, the identifier BM of the contents reproduced (or rendered) in the TV may be displayed.

The display device 100 may display the presence or absence of an identifier BM at a point in time T2 at which the user selects contents. For example, when the user selects particular contents, the display device 100 may display an identifier BM tagged to the contents.

When there is no identifier BMS at the point in time T1 and/or T2, the display device 100 may reproduce the contents without displaying the presence of absence of an identifier BM.

With reference to FIG. 27(b), the controller (180 in FIG. 1) may display a first display window on the display 151 in order to display whether or not there is a bookmark, an identifier BM, and/or receive a user input with respect to how to handle it. The user may select one of a bookmark view menu or a disregard menu displayed on the first display window.

When the user selects the disregard menu, the user can view the corresponding contents from the beginning regardless of whether or not there is a bookmark.

As shown in FIG. 28, a pop-up window for selecting particular contents from among various contents may be displayed on the display 151.

Selectable contents may be displayed on the pop-up window. For example, indications for selecting contents C1 to C3 and indications indicating whether or not there is a bookmark in the corresponding contents may be displayed. The user may select particular contents to be reproduced on the basis of the displayed information.

FIGS. 29 and 30 show example operations of the display device. As shown in FIGS. 29 and 30, the display device 100 may selectively display a bookmark according to the attribute of an electronic device in which a bookmark BM has been tagged.

With reference to FIG. 29, the electronic devices may be classified into a plurality of groups. For example, the electronic devices may be divided into a first group of common electronic devices, and a second group of personal electronic devices.

The common electronic devices may be those shared by people. For example, the common electronic devices may be a TV placed in a living room or a desktop computer used by several people.

The personal electronic devices may be those exclusively used by a particular person. For example, the personal electronic devices may be a mobile phone or a notebook computer.

While the common electronic devices and/or personal electronic devices are in use, a plurality of bookmarks BM may be tagged for particular contents. For example, bookmarks may be tagged in the respective devices for the particular contents.

As shown in FIG. 30(a), the display device may display all the bookmarks tagged with respect to particular contents. For example, the display device 100 may display second to fifth display windows P2 to P5. The second to fifth display windows P2 to P5 may show bookmarks BM tagged in each of the desktop computer, the TV, the phone, and the notebook computer. Namely, the bookmarks BM may be displayed regardless of the classification of the groups to which the respective electronic devices belong.

With reference to FIGS. 30(b) and (c), the display device may selectively display only bookmarks BM tagged in electronic devices belonging to a particular group. Namely, the display device 100 may display only the bookmarks tagged in the common electronic devices or only the bookmarks tagged in the personal electronic devices.

Implementations have been described with reference to the accompanying drawings. It will be apparent to those skilled in the art that various modifications and variations can be made without departing from the scope of the disclosure. Thus, it is intended that any future modifications or variations come within the scope of the appended claims.

What is claimed is:
1. A device comprising:
a processor; and a memory; a communication unit including at least one of a wireless communication module and a wired communication module; and
a circuit configured to:
obtain a content including a plurality of identifiers through the communication unit, wherein each of the plurality of identifiers indicate information related to a manipulation of the content, wherein the information includes at least one of an identification number, position information, device information, geographical information, and user information;
facilitate output, on an output unit, of a representation of the plurality of identifiers, wherein the output unit is separate from external electronic devices that performed manipulations of the content indicated by the plurality of identifiers;

determine that a manipulation of the content on the device terminates;

monitor for additional manipulation of the content on the device for a pre-set period of time after the determination that the manipulation of the content terminates on the device;

continue to monitor to determine whether manipulation of the content terminates on the device responsive to a determination that additional manipulation of the content occurred on the device during the pre-set period of time; and perform an operation directed to tagging an identifier for the content based on the manipulation of the content that terminates on the device responsive to a determination that additional manipulation of the content did not occur on the device during the pre-set period of time.

2. The device of claim 1, wherein the circuit is configured to:

obtain the plurality of identifiers by accessing a plurality of identifiers which each mark a point of the content at which the content was recently output by each of the different electronic devices; and facilitate output of the representation of the plurality of identifiers by facilitating output of the point of the content at which the content was recently output by each of the different electronic devices.

3. The device of claim 1, wherein the circuit is configured to:

obtain the plurality of identifiers by accessing a plurality of identifiers which each mark a task performed on the content by each of the different electronic devices; and facilitate output of the representation of the plurality of identifiers by facilitating output of the task performed on the content by each of the different electronic devices.

4. The device of claim 1, wherein the circuit is configured to perform the operation directed to tagging the identifier for the content by tagging an identifier for the content based on the manipulation of content that has terminated.

5. The device of claim 1, wherein the circuit is configured to perform the operation directed to tagging the identifier for the content by:

asking a user whether to perform tagging of an identifier for the content based on the manipulation of content that has terminated;

in response to asking the user, receiving user input indicating whether the user desires to perform tagging of an identifier for the content based on the manipulation of content that has terminated, and based on the user input indicating a desire by the user to perform tagging of an identifier for the content based on the manipulation of content that has terminated, tagging an identifier for the content based on the manipulation of content that has terminated.

6. The device of claim 1, wherein the circuit is configured to:

determine whether an identifier is available for each content item included in a set of content items; and based on the determination of whether an identifier is available for each content item included in a set of content items, facilitate output of a representation of the set of content items with an indication of whether an identifier is available for each content item included in the set of content items.

7. The device of claim 1, wherein the circuit is configured to facilitate output of the representation of the plurality of identifiers by facilitating output of the plurality of identifiers.

8. The device of claim 1, further comprising a display, wherein the circuit is configured to:

obtain the plurality of identifiers by receiving, through the communication unit and from a server, communications defining the plurality of identifiers; and facilitate output of the representation of the plurality of identifiers by displaying, on the display, a representation of the plurality of identifiers.

9. The device of claim 1, wherein the circuit is configured to:

obtain the plurality of identifiers by receiving, through the communication unit and from the different electronic devices, communications defining the plurality of identifiers, storing, in electronic storage, the plurality of identifiers defined based on the received communications, and accessing, from the electronic storage, the plurality of identifiers defined based on the received communications; and facilitate output of the representation of the plurality of identifiers by sending, through the communication unit and to a user device, communications that enable the user device to output a representation of the plurality of identifiers.

10. The device of claim 1, wherein the circuit is configured to receive a selection of an identifier from among the plurality of identifiers, determine a position of the content matched to the selected identifier, and facilitate output of the content starting from the determined position of the content matched to the selected identifier.

11. The device of claim 1, wherein the circuit is configured to obtain the plurality of identifiers by accessing a plurality of identifiers that each define a reproduction position with respect to the content, each define in which of the different electronic devices the corresponding identifier was tagged, and each define a user that tagged the corresponding identifier.

12. The device of claim 1, wherein the circuit is configured to:

obtain the plurality of identifiers by accessing a plurality of identifiers which each mark a manipulation of content performed by a user and which each indicate the user that performed the manipulation of content; and facilitate output of the representation of the plurality of identifiers by facilitating output of the representation of the plurality of identifiers based on the user that performed the manipulation of content indicated by each of the plurality of identifiers.

13. The device of claim 12, wherein facilitating output of the representation of the plurality of identifiers based on the user that performed the manipulation of content indicated by each of the plurality of identifiers comprises facilitating output of the representation of the plurality of identifiers with an indication of the user that performed the manipulation of content indicated by each of the plurality of identifiers.

14. The device of claim 12, wherein facilitating output of the representation of the plurality of identifiers based on the user that performed the manipulation of content indicated by each of the plurality of identifiers comprises:

determining an identity of a user to which the representation of the plurality of identifiers is to be output;

comparing the determined identity to indications of the user that performed the manipulation of content indicated by each of the plurality of identifiers;

based on comparison results, identifying a subset of the plurality of identifiers that match the determined identity; and facilitating output of a representation of the identified subset of the plurality of identifiers that match the determined identity.

15. A method implemented by a processor, comprising:

obtaining by the processor, a content including a plurality of identifiers through a communication unit, wherein each of the plurality of identifiers indicate information related to a manipulation of the content, wherein the information includes at least one of an identification number, position information, device information, geographical information, and user information;

facilitating output by the processor, on an output unit, of a representation of the plurality of identifiers, wherein the output unit is separate from external electronic devices that performed manipulations of the content indicated by the plurality of identifiers;

determining by the processor, that a manipulation of the content on the device terminates;

monitoring by the processor, for additional manipulation of the content on the device for a pre-set period of time after the determination that the manipulation of the content terminates on the device;

continuing to monitor by the processor, to determine whether manipulation of the content terminates on the device responsive to a determination that additional manipulation of the content occurred on the device during the pre-set period of time; and performing by the processor, an operation directed to tagging an identifier for the content based on the manipulation of the content that terminates on the device responsive to a determination that additional manipulation of the content did not occur on the device during the pre-set period of time.

16. The method of claim 15, wherein:

obtaining the plurality of identifiers comprises accessing a plurality of identifiers which each mark a point of the content at which the content was recently output by each of the different electronic devices; and facilitating output of the representation of the plurality of identifiers comprises facilitating output of the point of the content at which the content was recently output by each of the different electronic devices.

17. The method of claim 15, wherein:

obtaining the plurality of identifiers comprises accessing a plurality of identifiers which each mark a task performed on the content by each of the different electronic devices; and facilitating output of the representation of the plurality of identifiers comprises facilitating output of the task performed on the content by each of the different electronic devices.

18. The method of claim 15, wherein performing the operation directed to tagging the identifier for the content comprises tagging an identifier for the content based on the manipulation of content that has terminated.

19. The method of claim 15, wherein performing the operation directed to tagging the identifier for the content comprises:

asking a user whether to perform tagging of an identifier for the content based on the manipulation of content that has terminated;

in response to asking the user, receiving user input indicating whether the user desires to perform tagging of an identifier for the content based on the manipulation of content that has terminated, and based on the user input indicating a desire by the user to perform tagging of an identifier for the content based on the manipulation of content that has terminated, tagging an identifier for the content based on the manipulation of content that has terminated.

20. The method of claim 15, further comprising:

determining whether an identifier is available for each content item included in a set of content items; and based on the determination of whether an identifier is available for each content item included in a set of content items, facilitating output of a representation the set of content items with an indication of whether an identifier is available for each content item included in the set of content items.

21. The method of claim 15, wherein facilitating output of the representation of the plurality of identifiers comprises facilitating output of the plurality of identifiers.

22. The method of claim 15, wherein:

obtaining the plurality of identifiers comprises receiving, through the communication unit and from a server, communications defining the plurality of identifiers; and facilitating output of the representation of the plurality of identifiers comprises displaying, on a display, a representation of the plurality of identifiers.

23. The method of claim 15, wherein:

obtaining the plurality of identifiers comprises receiving, through the communication unit and from the different electronic devices, communications defining the plurality of identifiers, storing, in electronic storage, the plurality of identifiers defined based on the received communications, and accessing, from the electronic storage, the plurality of identifiers defined based on the received communications; and facilitating output of the representation of the plurality of identifiers comprises sending, through the communication unit and to a user device, communications that enable the user device to output a representation of the plurality of identifiers.

24. The method of claim 15, further comprising:

receiving a selection of an identifier from among the plurality of identifiers;

determining a position of the content matched to the selected identifier; and facilitating output of the content starting from the determined position of the content matched to the selected identifier.

25. The method of claim 15, wherein obtaining the plurality of identifiers comprises accessing a plurality of identifiers that each define a reproduction position with respect to the content, each define in which of the different electronic devices the corresponding identifier was tagged, and each define a user that tagged the corresponding identifier.

26. The method of claim 15, wherein:

obtaining the plurality of identifiers comprises accessing a plurality of identifiers which each mark a manipulation of content performed by a user and which each indicate the user that performed the manipulation of content; and facilitating output of the representation of the plurality of identifiers comprises facilitating output of the representation of the plurality of identifiers based on the user that performed the manipulation of content indicated by each of the plurality of identifiers.

27. The method of claim 26, wherein facilitating output of the representation of the plurality of identifiers based on the user that performed the manipulation of content indicated by each of the plurality of identifiers comprises facilitating output of the representation of the plurality of identifiers with an indication of the user that performed the manipulation of content indicated by each of the plurality of identifiers.

28. The method of claim 26, wherein facilitating output of the representation of the plurality of identifiers based on the user that performed the manipulation of content indicated by each of the plurality of identifiers comprises:
- determining an identity of a user to which the representation of the plurality of identifiers is to be output;
- comparing the determined identity to indications of the user that performed the manipulation of content indicated by each of the plurality of identifiers;
- based on comparison results, identifying a subset of the plurality of identifiers that match the determined identity; and
- facilitating output of a representation of the identified subset of the plurality of identifiers that match the determined identity.

* * * * *